United States Patent
Pei et al.

(10) Patent No.: US 12,255,686 B2
(45) Date of Patent: Mar. 18, 2025

(54) PER-SPAN OPTICAL FIBER NONLINEARITY COMPENSATION USING INTEGRATED PHOTONIC COMPUTING

(71) Applicants: Yinqing Pei, Kanata (CA); David Boertjes, Nepean (CA); Antoine Bois, Quebec (CA)

(72) Inventors: Yinqing Pei, Kanata (CA); David Boertjes, Nepean (CA); Antoine Bois, Quebec (CA)

(73) Assignee: CIENA CORPORATION, Hanover, MD (US)

( * ) Notice: Subject to any disclaimer, the term of this patent is extended or adjusted under 35 U.S.C. 154(b) by 317 days.

(21) Appl. No.: 18/103,673

(22) Filed: Jan. 31, 2023

(65) Prior Publication Data

US 2023/0254041 A1    Aug. 10, 2023

Related U.S. Application Data

(60) Provisional application No. 63/307,814, filed on Feb. 8, 2022.

(51) Int. Cl.
*H04B 10/2543*   (2013.01)
*G02B 6/293*     (2006.01)
(Continued)

(52) U.S. Cl.
CPC ..... *H04B 10/2543* (2013.01); *G02B 6/29304* (2013.01); *G06E 1/00* (2013.01);
(Continued)

(58) Field of Classification Search
None
See application file for complete search history.

(56) References Cited

U.S. PATENT DOCUMENTS 6,856,724 B2 *   2/2005   Bohn ................ H04B 10/2507
                                                        385/27
9,520,950 B2 *  12/2016   Harley ............... H04B 10/532
(Continued)

OTHER PUBLICATIONS

Sackesyn et al., Experimental realization of integrated photonic reservoir computing for nonlinear fiber distortion compensation, Optics Express, 2021 (Year: 2021).*
(Continued)

*Primary Examiner* — Jai M Lee
(74) *Attorney, Agent, or Firm* — INTEGRAL INTELLECTUAL PROPERTY INC.; Amy Scouten; Miriam Paton

(57) ABSTRACT

A method for per-span optical fiber nonlinearity compensation comprises determining values of fiber parameters characterizing one or more target optical fibers in one or more respective spans of a link, and applying selected weight values to one or more photonic computing chips (PCCs), each PCC integrated in a different respective span of the link, wherein selection of the weight values is based on the values of the fiber parameters and a mapping associated with each PCC. The method further comprises transmitting an optical signal through the link, wherein each integrated PCC emulates an inverse of a nonlinear transfer function of the target optical fiber in the respective span, thereby reducing nonlinearity contributed by the one or more target optical fibers to the optical signal.

20 Claims, 17 Drawing Sheets

(51) Int. Cl.
  *G06E 1/00* (2006.01)
  *H04B 10/079* (2013.01)
  *H01S 3/067* (2006.01)
  *H01S 3/16* (2006.01)

(52) U.S. Cl.
  CPC ...... *H04B 10/0799* (2013.01); *H01S 3/06754* (2013.01); *H01S 3/1608* (2013.01)

(56) References Cited

U.S. PATENT DOCUMENTS

| | | | | |
|---|---|---|---|---|
| 10,833,770 | B2* | 11/2020 | Zhang | H04L 27/36 |
| 11,139,633 | B2 | 10/2021 | Pei et al. | |
| 11,507,818 | B2* | 11/2022 | Hosseinzadeh | G06N 3/045 |
| 11,558,114 | B2* | 1/2023 | Yamagishi | H04B 10/079 |
| 2022/0173807 | A1* | 6/2022 | Yamagishi | H04B 10/58 |

OTHER PUBLICATIONS

Barwicz et al., "Polarization-transparent microphotonic devices in the strong confinement limit," Nature Photonics Letters, vol. 1, 2007.

Madsen et al., "Multistage dispersion compensator using ring resonators," Optics Letters, vol. 24, No. 22, 1999.

Neskorniuk et al., "End-to-End Deep Learning of Long-Haul Coherent Optical Fiber Communications via Regular Perturbation Model", ECOC 2021.

Sackesyn et al. "Experimental Demonstration of Nonlinear fibre Distortion Compensation with Integrated Photonic Reservoir Computing", ECOC 2021.

Sackesyn et al. "Experimental realization of integrated photonic reservoir computing for nonlinear fiber distortion compensation", Optics Express, vol. 29, No. 20, Sep. 27, 2021.

Sorokina, "Multi-channel optical neuromorphic processor for frequency-multiplexed signals," Journal of Physics: Photonics 3 (2021).

Suzuki et al., "Low-Loss Integrated-Optic Dynamic Chromatic Dispersion Compensators Using Lattice-Form Planar ightwave Circuits," OFC 2003 Optical Fiber Communications Conference, 2003.

Takiguchi et al., "Variable Group-Delay Dispersion Equalizer Using Lattice-Form Programmable Optical Filter on Planar Lightwave Circuit," IEEE Journal of Selected Topics in Quantum Electronics, vol. 2, No. 2, Jun. 1996.

Wang et al., "Multi-Wavelength Photonic Neuromorphic Computing for Intra and Inter-Channel Distortion Compensations in WDM Optical Communication Systems," arXiv:2210.00930v1, Oct. 2022.

* cited by examiner

PER-SPAN OPTICAL FIBER NONLINEARITY COMPENSATION USING INTEGRATED PHOTONIC COMPUTING

TECHNICAL FIELD

This document relates to the technical field of optical communications.

BACKGROUND

An optical communications system or network may comprise one or more links, where a given link connects a transmitter to a receiver by one or more optical fibers. Each link may comprise one or more spans or lengths of fiber. In order to compensate for attenuation loss, each span may be amplified by an optical amplifier, such as an erbium-doped fiber amplifier (EDFA).

Link accumulated optical noise consists of linear and nonlinear contributions. The linear noise results from optical amplification, that is, amplified spontaneous emission (ASE) noise. The nonlinear noise (also referred to as nonlinearity) results from a variety of sources including chromatic dispersion (CD), polarization mode dispersion (PMD), self-phase modulation (SPM), cross-phase modulation (XPM), and four-wave mixing (FWM), which is also referred to as the Kerr effect.

SUMMARY

According to a broad aspect, a photonic computing chip (PCC) comprises photonic circuit elements configured to apply optical signal processing to an input optical signal to generate an output optical signal, where the input optical signal comprises nonlinearity contributed by a target optical fiber. The PCC further comprises at least one electronic circuit element configured to control the optical signal processing based on values of fiber parameters characterizing the target optical fiber and a mapping associated with the PCC. The optical signal processing comprises operations emulating an inverse of a nonlinear transfer function of the target optical fiber, such that the PCC reduces the nonlinearity in the output optical signal relative to the nonlinearity in the input optical signal.

In some examples, the operations are based on machine learning.

In some examples, the PCC comprises a first element configured to generate, from the input optical signal, P weighted input signals characterized by P respective first weights, where P is a positive integer and $P \geq 2$, and a second element configured to generate the output optical signal of the PCC from a plurality of weighted output signals characterized by a respective plurality of second weights. Controlling the optical signal processing comprises controlling respective values of the first and second weights.

In some examples, the PCC comprises P third elements, each configured to divide a respective one of the P weighted input signals into N channelized input signals corresponding to N respective channels of an optical spectrum of the respective weighted input signal, where N is a positive integer and $N \geq 2$; for each third element, N fourth elements configured to apply N respective nonlinear operations to the N channelized input signals, thereby generating N channelized compensated signals; and P fifth elements, each configured to combine the N channelized compensated signals generated for a respective one of the P third elements.

In some examples, each fourth element comprises an electro-optic (EO) modulator and a photodiode (PD) configured to tap the respective channelized input signal, and wherein controlling the optical signal processing comprises controlling the EO modulator based on an output of the PD and a weight matrix.

In some examples, the third element comprises an arrayed waveguide grating (AWG) serving as a demultiplexer, and the fifth element comprises an AWG serving as a multiplexer.

In some examples, the third element comprises a tunable demultiplexer, and the fifth element comprises a tunable multiplexer.

In some examples, the PCC comprises at least one splitting element configured to separate an optical signal into a plurality of orthogonal input signals; for each orthogonal input signal, a duplicate version of at least a portion of the photonic circuit elements and the at least one electronic circuit element, the duplicate version being configured to process the orthogonal input signal to generate an orthogonal output signal, thereby resulting in a plurality of orthogonal output signals corresponding to the plurality of orthogonal input signals; and at least one combining element configured to combine the plurality of orthogonal output signals.

In some examples, the fiber parameters comprise one or more of a zero-dispersion wavelength $\lambda_0$ of the target fiber, a dispersion slope S of the target fiber, a nonlinear coefficient $\gamma$ of the target fiber, a length L of the target fiber, and a loss coefficient $\alpha$ of the target fiber.

In some examples, the operations are based on the Regular Perturbation Method (RPM).

In some examples, the PCC comprises a broadband optical splitter configured to generate, from the input optical signal, P+1 input signals, where P is a positive integer and $P \geq 2$; a delay element configured to apply a delay to one of the P+1 input signals, thereby generating a delayed input signal; for each of the remaining input signals, a set of RPM elements characterized by RPM weights and configured to optically process the respective input signal based on the RPM, thereby generating a respective compensated signal, for a total of P compensated signals; and a broadband optical combiner configured to combine the delayed input signal and the P compensated signals. Controlling the optical signal processing comprises controlling respective values of the RPM weights.

In some examples, the PCC comprises a first element configured to divide the input optical signal into N channelized input signals corresponding to N respective channels of an optical spectrum of the input optical signal, where N is a positive integer and $N \geq 2$; N second elements, each configured to generate, from a respective one of the N channelized input signals, P input signals, where P is a positive integer and $P \geq 2$; for each second element, a set of RPM elements characterized by RPM weights and configured to optically process the P input signals based on the RPM, thereby generating P compensated signals; N third elements, each configured to combine the P compensated signals generated for a respective one of the N second elements, thereby generating a respective channelized compensated signal; and a fourth element configured to combine the N channelized compensated signals. Controlling the optical signal processing comprises controlling respective values of the RPM weights.

In some examples, the PCC is positioned between a first amplification stage and a second amplification stage within an erbium-doped fiber amplifier (EDFA).

According to another broad aspect, a method comprises determining values of fiber parameters characterizing one or more target optical fibers in one or more respective spans of a link. The method further comprises applying selected weight values to one or more photonic computing chips (PCCs), each PCC integrated in a different respective span of the link, wherein selection of the weight values is based on the values of the fiber parameters and a mapping associated with each PCC. The method further comprises transmitting an optical signal through the link, where each integrated PCC emulates an inverse of a nonlinear transfer function of the target optical fiber in the respective span, thereby reducing nonlinearity contributed by the one or more target optical fibers to the optical signal.

In some examples, determining the values comprises measuring the values from the target optical fiber or obtaining the values from provisioning.

In some examples, the fiber parameters comprise one or more of a zero-dispersion wavelength $\lambda_0$ of each target optical fiber, a dispersion slope S of each target optical fiber, a nonlinear coefficient $\gamma$ of each target optical fiber, a length L of each target optical fiber, and a loss coefficient $\alpha$ of each target optical fiber.

In some examples, the PCC is designed in accordance with a nonlinear compensation model based on machine learning.

In some examples, the PCC is designed in accordance with a nonlinear compensation model based on analytical equations.

In some examples, the mapping associated with each PCC comprises a look-up table (LUT) or an artificial neural network (ANN).

In some examples, the method comprises generating the mapping associated with each PCC using a simulated version of the respective PCC and a plurality of simulated optical fibers; and fine tuning the mapping associated with each PCC using the respective PCC and a plurality of manufactured optical fibers.

BRIEF DESCRIPTION OF THE DRAWINGS

FIG. 6-1 illustrates an example PCC architecture based on machine learning and incorporating wavelength division multiplexing (WDM) parallelism;

FIG. 6-2 illustrates an example weight matrix;

DETAILED DESCRIPTION

Figure 1:
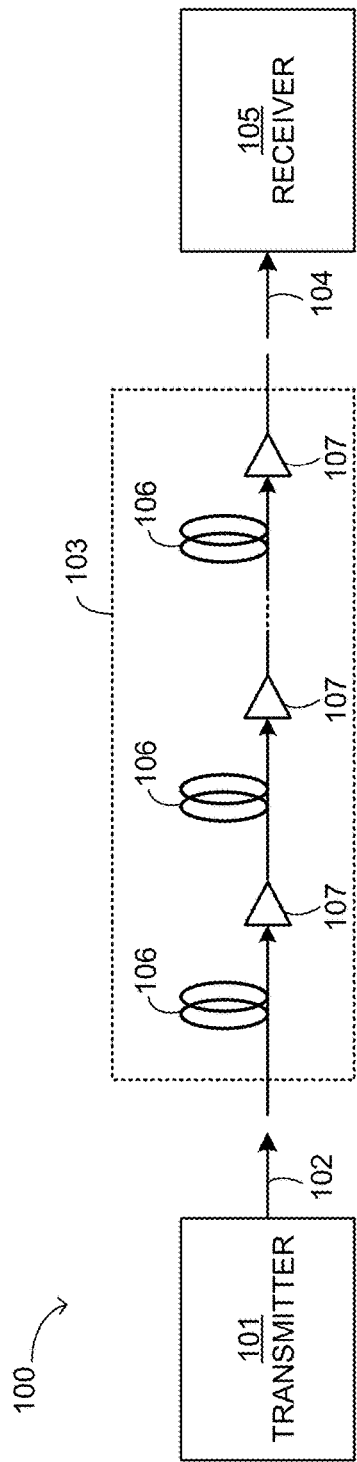
FIG. 1 illustrates an example optical communication system.

FIG. 1 illustrates an example optical communication system 100. A transmitter 101 and a receiver 105 are connected via a telecommunications cable (not shown) carrying optical fibers. The cable may be, for example, a submarine cable or a terrestrial cable. One or both of the transmitter 101 and the receiver 105 may comprise a transceiver capable of both transmitting optical signals and receiving optical signals.

The transmitter 101 is configured to generate an optical signal 102 which may be representative of data, for example, in the form of symbols. According to some examples, the transmitter 101 may comprise a digital signal processor (DSP) configured to process the symbols, for example, by performing one or more of pulse shaping, subcarrier multiplexing (for example, frequency division multiplexing (FDM) or wavelength division multiplexing (WDM)), chromatic dispersion (CD) pre-compensation, and distortion pre-compensation on the symbols. The transmitter 101 may be configured for coherent or non-coherent transmission.

An optical link 103 connecting the transmitter 101 to the receiver 105 comprises multiple spans, where each span comprises a length of optical fiber 106 and an optical amplifier 107 for compensation of attenuation loss in the optical fiber 106. In some examples, the optical amplifiers 107 may comprise erbium-doped fiber amplifiers (EDFAs). According to some examples, the spans may be ~80 km in length. For simplicity, only three spans are illustrated in the optical link 103. Typically, the number of spans in an optical link is much larger. However, in some examples, a link may comprise a single span of optical fiber.

The receiver 105 is configured to receive an optical signal 104 output by the optical link 103. The receiver 105 may be configured for coherent or non-coherent detection, in accordance with the configuration of the transmitter 101. The receiver 105 is configured to generate digital signals corresponding to the optical signal 104. According to some examples, the receiver 105 may comprise a DSP configured to apply equalization processing to the digital signals to compensate for various channel impairments, such as CD, state-of-polarization (SOP) rotation, polarization mode dispersion (PMD) including group delay (GD) and differential group delay (DGD), polarization-dependent loss or gain (PDL or PDG), and other effects. The DSP of the receiver may further perform operations such as multiple-output (MIMO) filtering, clock recovery, carrier recovery processing, and subcarrier de-multiplexing.

The optical link 103 accumulates optical noise consisting of linear and nonlinear contributions. The optical amplifiers 107 contribute linear noise in the form of amplified spontaneous emission (ASE) noise. The nonlinear noise (or nonlinearity) results from sources such as CD, PMD self-phase modulation (SPM), cross-phase modulation (XPM), and four-wave mixing (FWM), which is also referred to as the Kerr effect. The Kerr effect is a third-order nonlinearity, in which three fields (separated in time, or separated in frequency) interact to produce a fourth field. The Kerr effect is referred to as intra-channel Kerr nonlinear noise in cases where the three interacting fields are within a channel and the resulting fourth field is also within that same channel. The Kerr effect is referred to as inter-channel Kerr nonlinear noise in cases where the three interacting fields are between different channels (that is, one interacting field is from one channel and two interacting fields are from another channel, or each interacting field is from a different channel) and in cases where the three interacting fields are from one channel and the resulting fourth field is in a different channel.

Nonlinear phase created on an optical carrier (that is, the phase imparted to the optical field envelope by means of the Kerr effect stemming from the intensity of the optical field) is an important measure of fiber nonlinearity, which depends on signal optical power and the fiber nonlinear parameter. In a fiber system with multiple amplified spans (i.e., spans comprising inline optical amplifiers, such as the communication system 100), nonlinear phase from different spans will accumulate.

The ratio of linear noise to nonlinear noise depends on the power of the optical signal during transmission.

Figure 2:
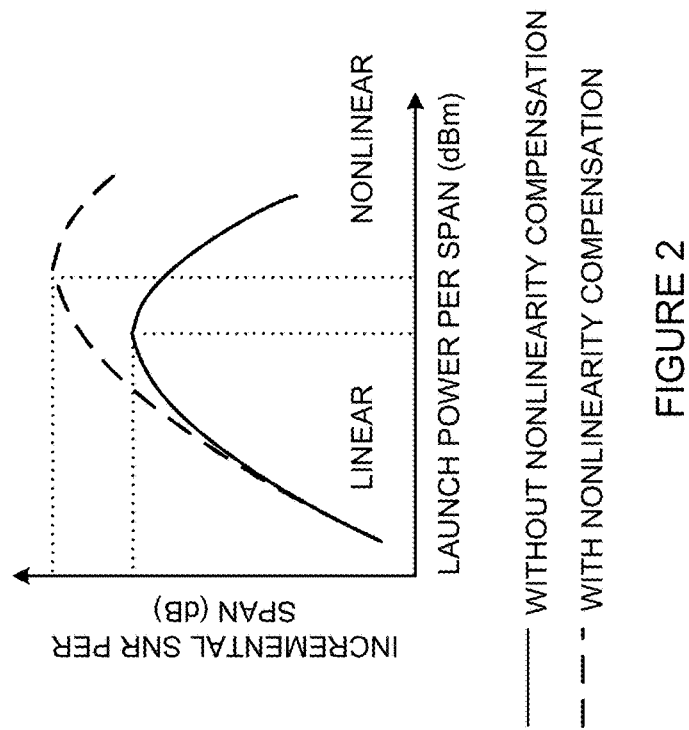
FIG. 2 illustrates a plot of incremental signal-to-noise ratio (SNR) as a function of launch power per span with and without nonlinearity compensation.

FIG. 2 illustrates a plot of incremental signal-to-noise ratio (SNR) per span as a function of launch power per span and the benefit of implementing per span nonlinearity compensation.

At low launch powers (i.e., in the linear regime), the link accumulated noise is dominated by linear noise and the incremental SNR of each span increases with increasing launch power. However, at higher launch powers (i.e., in the nonlinear regime), the fiber nonlinearities become dominant, and the incremental SNR of each span begins to decrease with increasing launch power.

In order to reduce the impact from fiber nonlinearity, network operators generally avoid operating in the nonlinear regime by limiting the signal power launched into the fiber. Thus, fiber nonlinearity is an important factor that may limit system capacity and transmission performance. It is advantageous to reduce fiber nonlinearity on a per-span basis to push the nonlinear regime to a higher per-span launch power. This may allow the launch power per span to be further increased with additional gain of incremental SNR per span.

With the increase of WDM channels and per-channel data rates, performance penalties induced by fiber nonlinearity become more and more important in optical network design and operation. There are methods to compensate for the total nonlinear distortion of the entire fiber link with pre-distortion or post-compensation methods at coherent transmitters and receivers. However, these methods are implemented electrically, with limited bandwidth. Moreover, since they can only be applied to each optical channel respectively, these methods are incapable of addressing XPM due to the fiber nonlinearity.

Emerging photonic computing technology has shown promise for broadband optical signal processing with a small footprint/size and low power consumption. Photonic computing uses optical components to realize computational functions. Current applications of photonic computing are primarily focused on replacing the existing electrical digital computer with the photonic counterpart, for realizing general machine learning tasks such as pattern recognition, classification, and the like.

In "*Experimental realization of integrated photonic reservoir computing for nonlinear fiber distortion compensation,*" Opt. Express 29, 30991-30997 (2021), Sackesyn et al. proposed the use of photonic computing to compensate for fiber nonlinearity of a single fiber span. A photonic computing chip (PCC) was configured to form the inverse model of the fiber nonlinear transfer function of the optical fiber in the span such that, when integrated within the span, the PCC would effectively cancel the fiber nonlinearity. Sackesyn et al. were only able to demonstrate nonlinear compensation of a single fiber span because the weights used to control the PCC were trained with the transmitter and receiver signals in the electrical domain. The loss incurred by the PCC was compensated using an EDFA.

In accordance with the technology proposed herein, fiber nonlinearity may be compensated on a per-span basis in a multi-span optical communication system using a plurality of PCCs. Each PCC may be configured to obtain the inverse model of the fiber transfer function of a respective span in the multi-span system. Once the plurality of PCCs is integrated within the respective plurality of spans, they effectively cancel the nonlinear impairments of the spans. In this manner, the integrated PCCs described in this document may be used to achieve fiber nonlinearity compensation in multi-span optical links (i.e., links comprising two or more spans). By compensating for fiber nonlinearity on a per-span basis in a multi-span optical communication system, higher launch powers and better SNR performance may be achieved for each span.

Figure 3:
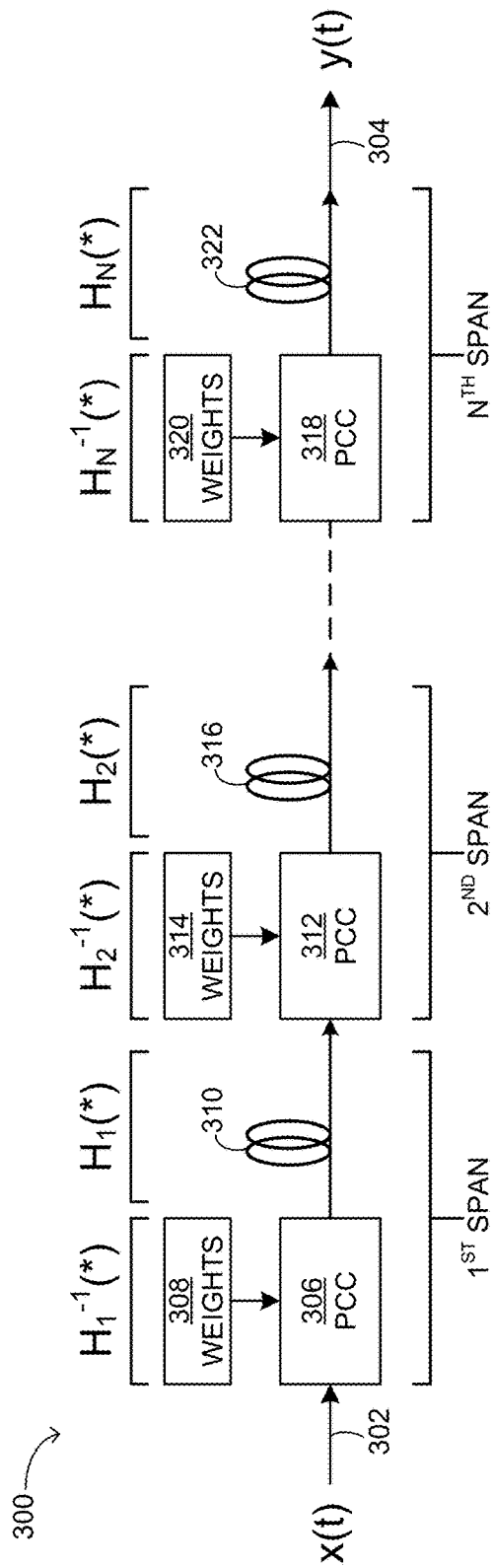
FIG. 3 illustrates a first example multi-span optical link comprising integrated photonic computing chips (PCCs) configured for per-span fiber nonlinearity compensation.
Figure 4:
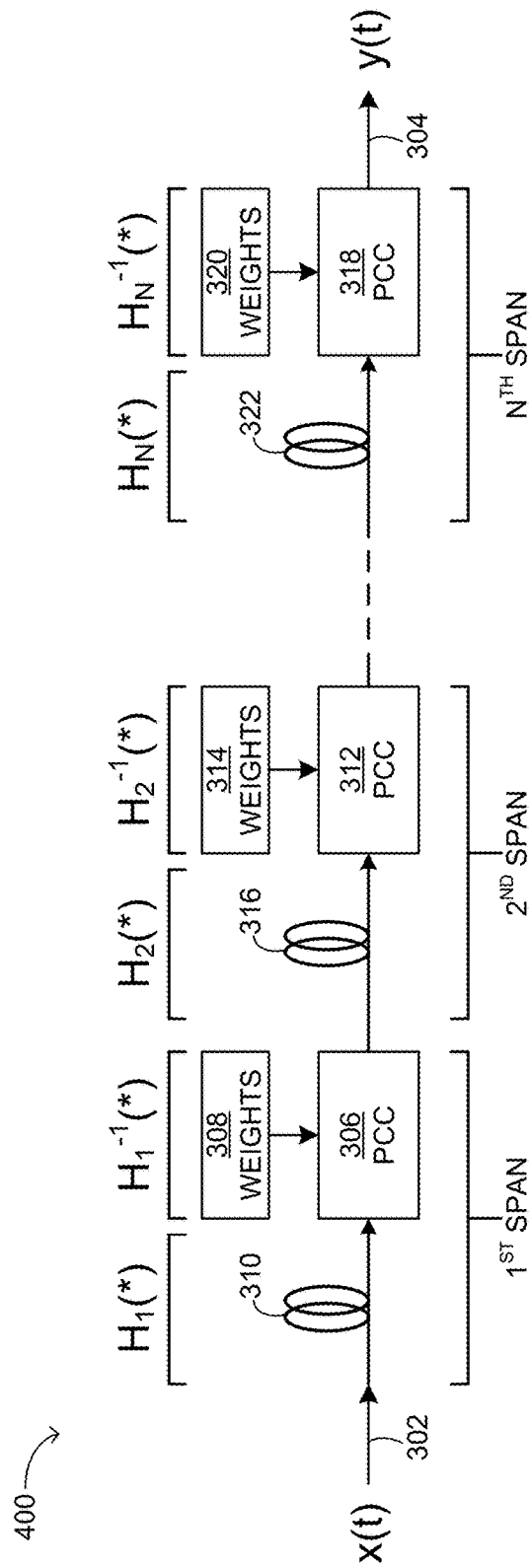
FIG. 4 illustrates a second example multi-span optical link comprising integrated PCCs configured for per-span fiber nonlinearity compensation.

FIGS. 3 and 4 illustrate example multi-span optical links 300 and 400, respectively, comprising integrated PCCs configured for per-span fiber nonlinearity compensation. Each link consists of N spans, where N is a positive integer greater than or equal to two. For clarity, FIGS. 3 and 4 illustrate only the first, second, and $N^{th}$ spans, where it is implicit that N≥3 in these particular examples. Although not explicitly illustrated, each span may be an amplified span, meaning a span comprising an optical amplifier for compensation of attenuation loss. The first span of each link receives an input signal 302 denoted by x(t), and the $N^{th}$ span of each link produces an output signal 304 denoted by y(t), where x(t) and y(t) represent the respective input and output signals (both amplitude and phase) at time t. The first span comprises a first fiber 310; the second span comprises a second fiber 316; and the $N^{th}$ span comprises an $N^{th}$ fiber 322. A PCC 306 is integrated in the first span; a PCC 312 is integrated in the second span; and a PCC 318 is integrated in the $N^{th}$ span. The PCCs may be integrated in their respective spans by incorporating the PCCs into network elements of the respective spans, such as amplifiers, as will be described further with respect to FIGS. 12 and 13. In the link 300, the PCCs 306, 312, and 318 act as pre-compensators for nonlinearity in the fibers 310, 316, and 322, respectively. In the link 400, the PCCs 306, 312, and 318 act as post-compensators for nonlinearity in the fibers 310, 316, and 322, respectively.

The fiber in the $n^{th}$ span of the link, where $1 \leq n \leq N$, has an input signal $x_n(t)$, an output signal $y_n(t)$, and a transfer function denoted by $H_n$. The Laplace transformations of the input and output signals may be expressed as $X_n=L(x_n(t))$ and $Y_n=L(y_n(t))$, respectively, where L denotes the Laplace transformation operation. The Laplace transformations $X_n$ and $Y_n$ are related by $Y_n=X_n*H_n$, where * denotes multiplication. To compensate for the impairment of $H_n$, the PCC integrated in the $n^{th}$ span is configured to obtain a transfer function $H_n^{-1}$, which is the inverse of $H_n$. For example, the PCC 312 is configured to obtain a transfer function $H_2^{-1}$ which is the inverse of the transfer function $H_2$ of the second fiber 316 in the second span of the link. Provided that a suitably configured PCC is integrated in each span of the N-span link, the Laplace transformation Y of the output signal y(t) of the N-span link may be expressed as:

$$Y = X * \Pi_{n=1}^{N}(g_n H_n^{-1} H_n) = X \Pi_{n=1}^{N} g_n \quad [1]$$

Where X denotes the Laplace transformation of the input signal x(t) of the N-span link, and where $g_n$ denotes the gain or loss in the $n^{th}$ span. In each span, the transfer function of the PCC and the transfer function fiber cancel each other. The inverse Laplace transformation, denoted by $L^{-1}()$, may be applied to both sides of Equation 1 as follows:

$$L^{-1}(Y) = L^{-1}(X) \Pi_{n=1}^{N} g_n \quad [2]$$

thereby converting Equation 1 to an equivalent time-domain expression:

$$y(t) = x(t) = \Pi_{n=1}^{N} g_n \quad [3]$$

It follows from Equation 3 that the fiber nonlinearities of the link do not impact the output signal y(t).

In order for each PCC to achieve a transfer function that is the inverse of the transfer function of a respective fiber in the link, trained weights are applied to the PCC, as will be described in more detail below. For example, weights 308 are applied to the PCC 306 integrated in the first span; weights 314 are applied to the PCC 312 integrated in the second span; and weights 320 are applied to the PCC 318 integrated in the $N^{th}$ span.

The architecture of a PCC configured for per-span fiber nonlinearity compensation may be designed based on one of two different concepts: (i) a compensation model based on machine learning or (ii) a compensation model based on analytical equations. Both concepts will be described in more detail below, beginning with compensation based on machine learning models, also referred to as artificial neural networks (ANNs).

ANNs may be trained to represent any arbitrary functions, including the inversed fiber nonlinear transfer functions. In the recent publication "Multi-wavelength photonic neuromorphic computing for intra and inter-channel distortion compensations in WDM optical communication system," arXiv preprint arXiv:2210.00930 (2022), Wang et al. describe a multichannel approach to an ANN for fiber-nonlinearity compensation. However, the technology described by Wang et al. has a number of shortcomings. For example, the technology selects the channel individually only, rather than the full spectrum including its noise, on the basis of a resonant architecture; the technology does not work on the basis of a compensation per span, but rather performs compensation at the receiver; the technology uses an architecture with external lasers (neuron pumps) to regenerate the signal entirely, as opposed to working from taps; the technology combines the signal in the optical domain to act as weights between the channels, then sends the combined output to a single photodiode, not accounting for heterodyne beats between closely spaced channels as is the case for dense wavelength division multiplexing (DWDM) coherent communications; the technology relies on an architecture with unavoidable waveguide crossings; and the number of active elements used in the technology scales as $O(N^2)$ with the number of channels, assuming a weighting among all channels, whereas the architecture described by Sackesyn et al. scales O(N).

In order for an ANN-based PCC inserted into a fiber link span to compensate for the fiber nonlinearity across the entire signal band, it is necessary to take as an input an entire spectrum containing all the multiplexed signal channels and multiplexed noise distributed over a given optical band and over all polarizations. Such an optical band, for example, the C-band (i.e., the Conventional band ranging from 1530 nm to 1565 nm), the L-band (i.e., the Long-wavelength band ranging from 1565 nm to 1625 nm), or the C+L band (i.e., ranging from 1530 nm to 1625 nm), typically covers multiple THz in optical bandwidth. One possible approach is to implement the compensation unit all optically with optical components covering the entire signal band of interest. For example, in "Multi-channel optical neuromorphic processor for frequency-multiplexed signals," *Journal of Physics: Photonics,* 2020, Sorokina demonstrated an all-optical compensation method for a 5-channel link. However, it may be challenging to further increase the processing bandwidth to the full C-band or L-band or C+L band, due to dispersion of the optical components. Furthermore, this approach is based on a nonlinear map (echo state network) which may not be scalable.

Figure 5:
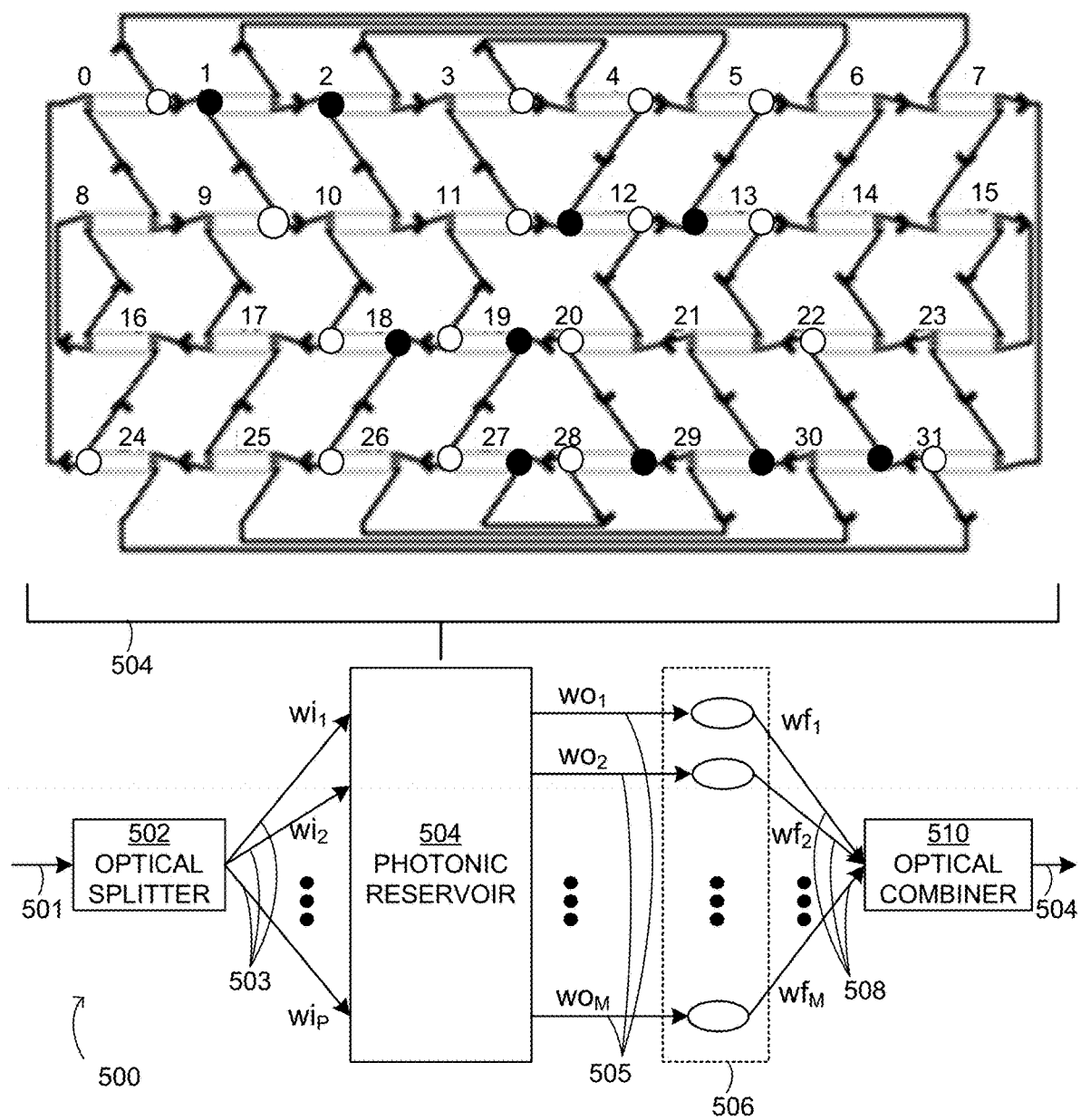
FIG. 5 illustrates an example PCC architecture based on machine learning and incorporating a photonic reservoir structure.

In the PCC described by Sackesyn et al. in "*Experimental realization of integrated photonic reservoir computing for nonlinear fiber distortion compensation,*" Opt. Express 29, 30991-30997 (2021), an ANN in the form of a photonic reservoir is used to model the linear transfer function. This is described in more detail with respect to FIG. 5, which illustrates an example PCC architecture 500.

The PCC 500 compensates for fiber nonlinearity based on machine learning and using a photonic reservoir structure which comprises a network of optical lines with multiple inputs and multiple outputs. The PCC 500 uses a photonic reservoir 504 comprising 32 nodes with four ports (meaning that each node has two input ports and two output ports), as reproduced from FIG. 1 of Sackesyn et al. in "*Experimental realization of integrated photonic reservoir computing for nonlinear fiber distortion compensation,*" Opt. Express 29, 30991-30997 (2021). Filled circles are used to represent the ten input nodes (1, 2, 12, 13, 18, 19, 27, 28, 29, 30), while open circles are used to represent the 17 output nodes (0, 3, 4, 5, 9, 11, 12, 13, 18, 19, 20, 22, 24, 26, 27, 28, 31). The photonic reservoir 504 is merely one possible example of a photonic reservoir that may be employed in a PCC configured for nonlinearity compensation, many other photonic reservoir structures also being possible.

From a signal 501 output by the optical fiber to be compensated (for example, a signal output by the fiber 310), a plurality of signals 503 are generated by an optical splitter 502, where each signal 503 is a weighted copy of the signal 501. For example, P signals 503 have P respective weights denoted by $wi_1, \ldots, wi_P$, where P is a positive integer and P≥2. The signals 503 are provided as inputs to the photonic reservoir 504. In this example, P=10, corresponding to the ten input nodes of the photonic reservoir 504. The photonic reservoir 504 performs a linear addition of the signals 503 using different delays. A plurality of signals 505 are output by the photonic reservoir 504. For example, the signals 505 may consist of M signals, where M is a positive integer and M≥2. The M signals 505 have M respective weights denoted by $wo_1, \ldots, wo_M$. In this example, M=17, corresponding to the 17 output nodes of the photonic reservoir 504. In general, the values of P and M are dictated by the structure of the photonic reservoir.

While the photonic reservoir structure 504 is a linear network (such that each node represents a linear operation), in order to create the inverse nonlinear transfer function of the optical fiber, nonlinear activation nodes 506 are applied to the signals 505 output by the photonic reservoir 504, thereby resulting in respective signals 508. Each one of the nonlinear activation nodes 506 represents a nonlinear operation which is applied to a respective one of the signals 505 to generate a respective one of the signals 508. The M signals 508 have M respective weights denoted by $wf_1, \ldots, wf_M$. Various nonlinear operations are contemplated, such as, but not limited to, sigmoid functions, rectified linear unit functions, hyperbolic tangent functions, and irregular functions.

It is contemplated that the signals 508 may be combined using an optical combiner 510, thereby resulting in an output signal 504 representing the sum of the signals 508. By appropriately setting the weights applied to the signals 503 ($wi_k$ for k=1 . . . P), the weights applied to the signals 505 ($wo_k$ for k=1 . . . M), and the weights applied to the signals 508 ($wf_k$ for k=1 . . . M), the PCC 500 may be configured to compensate for the nonlinearity in the input signal 501.

Determining the weights to be used for fiber nonlinearity compensation involves a process known as weight training. Weight training involves adjusting the values of the weights applied to the PCC until the output signal satisfies certain requirements, keeping a record of those values, and using those values in real system operation. Currently, known methods for weight training are implemented in the electrical domain by converting the optical signal to the electrical domain to compare with the desired signal using electrical instrumentation. For example, the experimental results described by Sackesyn et al. were based on an electrical readout strategy which used optical-to-electrical conversion and offline data processing to realize the nonlinear activation functions 506 and the combiner 510. However, application of the PCC 500 is targeted to a single span. The output of the PCC 500 is an electrical signal and is directly received in electrical domain. In addition, the PCC 500 cannot handle a WDM signal in the optical domain. By implementing the photonic reservoir 504, the nonlinear activation nodes 506, and the combiner 510 in the optical domain, the PCC 500 may be integrated into a given span of a multi-span link, where the weights applied to the PCC 500 have been trained to achieve nonlinearity compensation in that span. For example, where the weights $wi_k$ for k=1 . . . P and the weights $wo_k, wf_k$ for k=1 . . . M are trained to make the PCC 500 compensate for nonlinearity in the first fiber 310, the PCC 500 may be used as the PCC 306. In this case, the trained weights $wi_k$ for k=1 . . . P and the weights $wo_k, wf_k$ for k=1 . . . M would be equivalent to the weights 308.

Another approach for compensation based on machine learning is the use of WDM parallelism to realize a channelized nonlinear node in an ANN. This is described in more detail with respect to FIG. 6-1, which illustrates an example PCC architecture 600 based on machine learning and incorporating WDM parallelism.

From a signal 601 output by the optical fiber to be compensated (for example, a signal output by the fiber 310), a plurality P of signals 603 are generated by an optical splitter 602, where P is a positive integer and P≥2. In this example, the P signals 603 are linearly transformed by the application of P respective weights denoted by $wi_1, \ldots, wi_P$. In other examples, the linear part may still be realized in a broadband manner without this parallelism.

Each weighted signal 603 is a provided as an input to a respective nonlinear node 604 that is configured to implement a nonlinear activation function. An example architecture 611 of each nonlinear node 604 comprises an arrayed waveguide grating (AWG) 612, serving as a demultiplexer, which divides the spectrum of the respective signal 603 into a plurality of slices, also referred to as channelization. The spectrum may be divided into manageable slices, each having a bandwidth between approximately 50 GHz and approximately 100 GHz, for example. In this example, the AWG 612 divides the signal 603 into N respective signals 613, where N is a positive integer and N≥2, and where $\lambda_i$ denotes a central wavelength for the $i^{th}$ slice. Being fully passive, the AWG 612 may be realized in a variety of low-loss material platforms, such as low-index contrast $SiO_2$-on-Si platforms, which are commonly called planar optical circuits (PLCs).

For each signal 613, a tap may be used to divert a fraction of the light to a high-speed photodetector or a photodiode (PD) 614. The PDs 614 may be used to provide feedback to a nonlinear activation function through a weight matrix realized in the electrical domain. For example, using electronic components of the PCC 600, a weight matrix 616 may be applied to the N electrical signals 615 output by the N respective PDs 614, thereby resulting in N respective electrical signals 617. Each signal 617 may act as an electrical input of a biased electro-optic (EO) modulator 618 which operates at the corresponding frequency for that slice of the spectrum. Such high-speed optical modulation may be realized, for example, using carrier depletion, the Pockels effect, the Franz-Keldysh effect, or the quantum-confined Stark effect, depending on the material platform of choice, which may be, for example, one of silicon-on-insulator (SOI), indium phosphide (InP), or lithium niobate (LN).

Figures 1, 6:
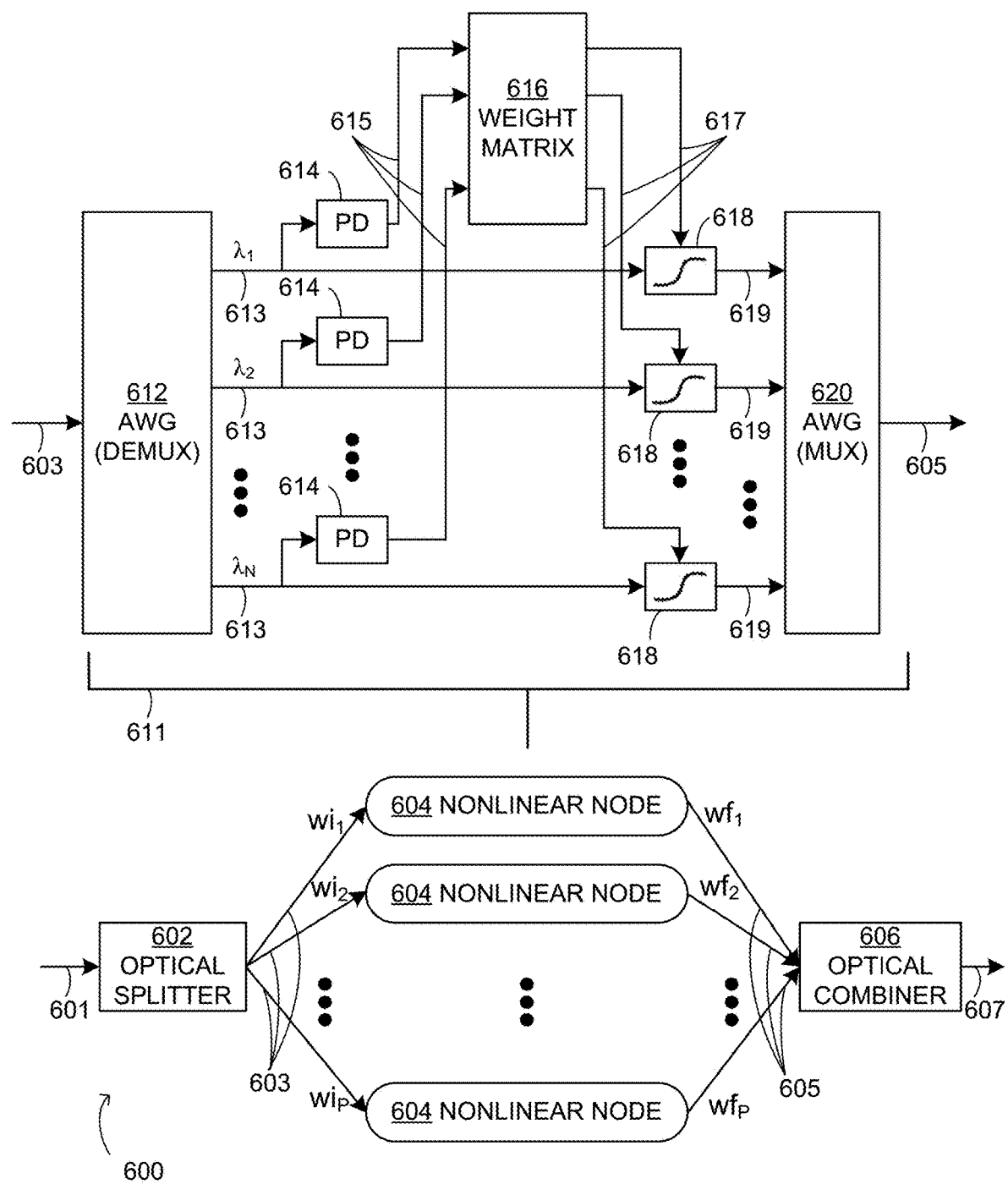
Figures 2, 6:
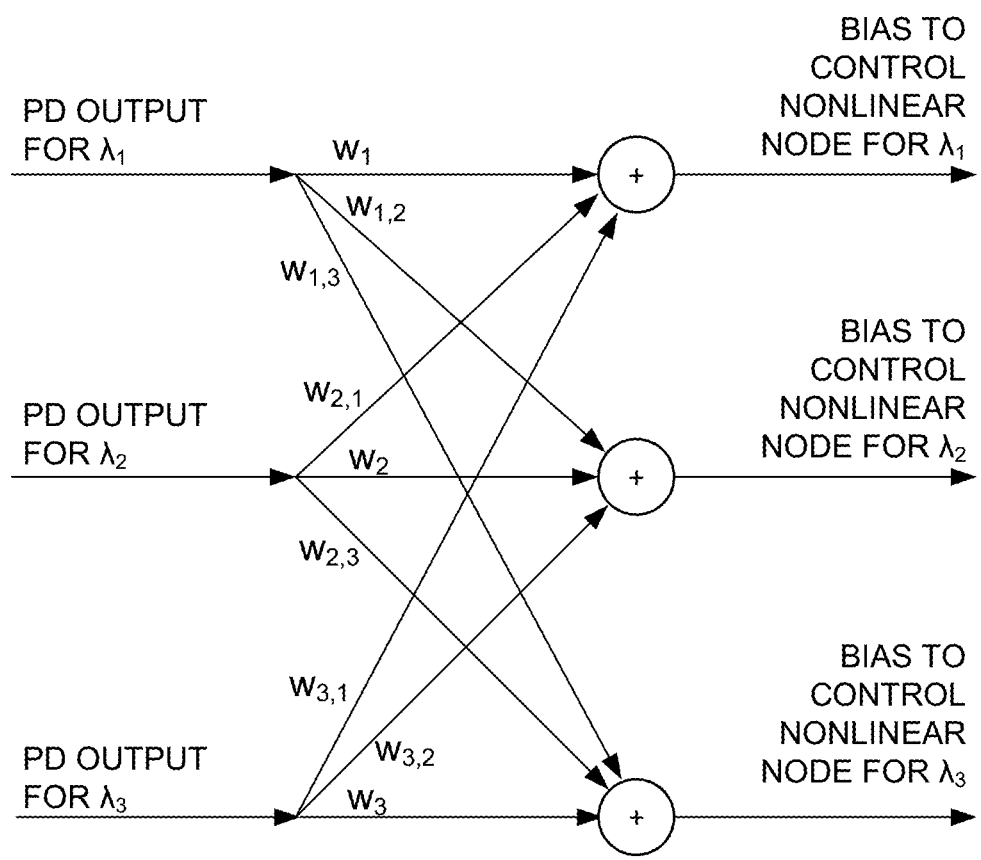

A weight matrix, such as the weight matrix 616, combines output from multiple wavelengths (such as the signals 615 from the PDs 614) with different weights as the biases to apply to different nonlinear nodes (such as the EO modulators 618). FIG. 6-2 illustrates an example weight matrix 650 for three channels. The output of each PD is split into three paths to be combined for bias of the nonlinear nodes processing signals at different wavelengths. A weight is applied to each path; each weight denoted by $w_i$ accounts the for the intra-channel nonlinear distortion associated with the channel of wavelength $\lambda_i$, where i=1 . . . 3; each weight denoted by wig accounts for the inter-channel nonlinear interference from the channel of wavelength $\lambda_i$ to the channel of wavelength $\lambda_j$, where i=1 . . . 3, where j=1 . . . 3, and where i≠j. According to some examples, the weights $w_i$ and $w_{i,j}$ may comprise real numbers ranging from 0 to 1 inclusively. The number of weights in the weight matrix 650 depends on how many adjacent channels are included in the nonlinear compensation. To compensate for nonlinear interference from all channels, where would be N×N weights, where N denotes the number of wavelengths at the output of the demultiplexing AWG (i.e., the number of signals 613).

However, since inter-channel nonlinear interference is more pronounced between adjacent channels in optical fiber, the number of weights may be reduced to M×N, where M<N.

As will be described in more detail with respect to FIGS. 7 and 8, each EO modulator 618 may take the form of a Mach-Zehnder modulator (MZM) or a micro-ring resonator modulator (MRM). Depending on the specific modulator implementation and bias, a variety of arbitrary nonlinear activation functions may be tailored. To compensate for inter-channel nonlinearity, the electrical outputs of the PDs 614 may be combined among the WDM channels with a weighting scheme (i.e., the weight matrix 616) for each EO modulator 618 in such a way that the overall nonlinear activation function over the entire spectrum is transparent to this demultiplexing, as it then incorporates all optical channels. The slicing of the spectrum may also allow for more fine-grained weighting among the channels that may otherwise be difficult to implement with an un-channelized all-optical nonlinearity compensation. Following the nonlinear processing of the signals 613 by the respective EO modulators 618, the respective output optical signals 619 may be recombined by an AWG 620 serving as a multiplexer, thereby yielding the signal 605. Because channel centering is not critical, matching AWGs for the input demultiplexer and the output multiplexer may be selected by a binning process.

For ease of illustration, the AWGs 612, 620 are shown as comprising part of the nonlinear node 611. However, the slicing and combining of the optical spectrum are linear operations. It is the combination of the PDs 614, the weight matrix 616, and the EO modulators 618 that achieves the nonlinear operation.

The P signals 605 have P respective weights denoted by $wf_1, \ldots, wf_P$. The signals 605 may be combined using an optical combiner 606, thereby resulting in an output signal 607 representing a sum of the signals 605. By appropriately setting the weights applied to the signals 603 ($wi_k$ for $k=1 \ldots P$), with weights of the weight matrix 616, and the weights applied to the signals 605 ($wf_k$ for $k=1 \ldots P$), the PCC 600 may be configured to compensate for the nonlinearity in the input signal 601.

Figure 7:
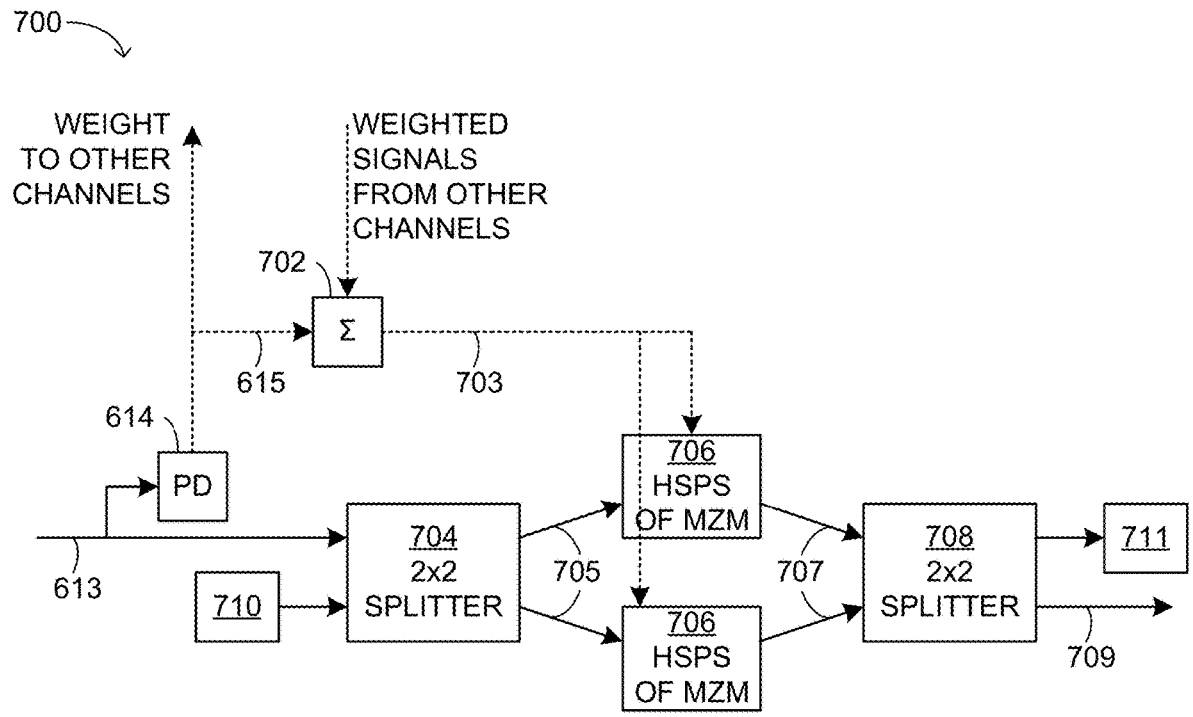
FIG. 7 illustrates a first example implementation of a nonlinear activation function for incorporation within the PCC architecture illustrated in FIG. 6-1.

FIG. 7 illustrates a first example implementation 700 of a nonlinear activation function for incorporation within the PCC architecture 600. As described with respect to FIG. 6-1, a given one of the optical signals 613 (i.e., a particular channel) is tapped by the PD 614 to generate an electrical signal 615. In addition to being sent as a weight to other channels (i.e., for use with other signals 613), the electrical signal 615 is combined with weighted signals from other channels using a combining operation 702, thereby resulting in an electrical signal 703. Thus, the combining operation 702 (together with the other combining operations used for the other signals 613) effectively implements the weight matrix 616.

In parallel to generating the electrical signal 703, a first 2×2 optical splitter 704 is applied to the optical signal 613, thereby resulting in two optical signals 705. A termination 710 may be used for back-reflected light. Two parallel high-speed phase shifters (HSPSs) 706 of a MZM are respectively applied to the two optical signals 705, resulting in two respective optical signals 707. Each HSPS 706 is controlled by the electrical signal 703. Together, the HSPSs 706 implement the nonlinear activation function achieved by the EO modulator 618. A second 2×2 optical splitter 708 is applied to the optical signals 707, thereby resulting in an optical signal 709 (corresponding to the signal 610). The other output of the splitter 708 may simply be terminated as denoted at 711, or may be provided to a photodiode used for bias control of the MZM. In some examples, bias control is done separately.

Figure 8:
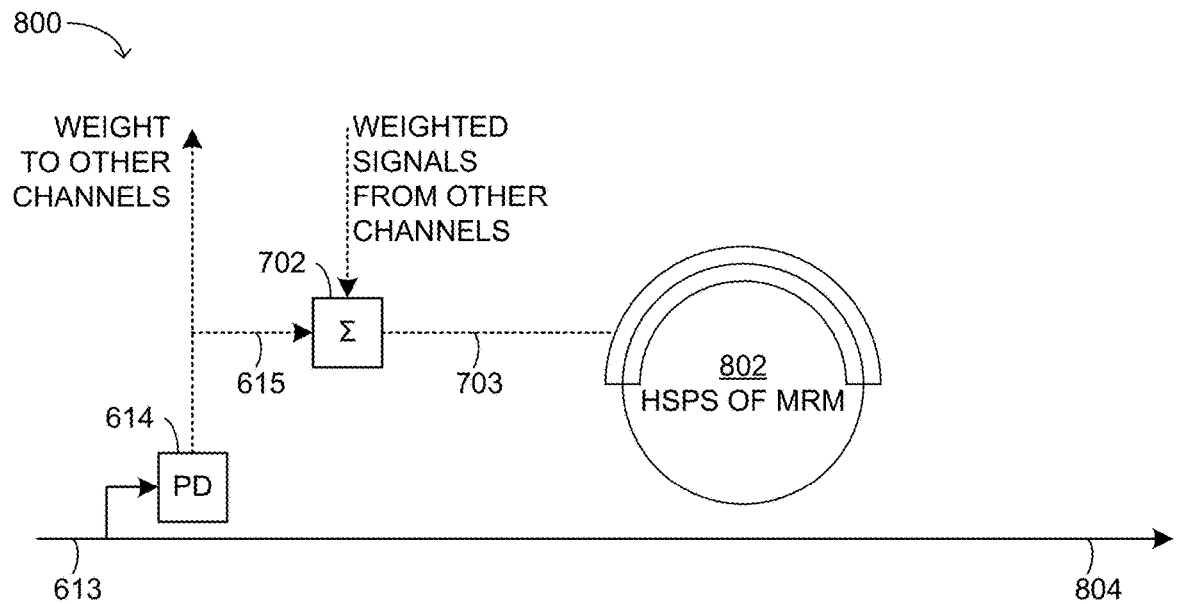
FIG. 8 illustrates a second example implementation of a nonlinear activation function for incorporation within the PCC architecture illustrated in FIG. 6-1.

FIG. 8 illustrates a second example implementation 800 of a nonlinear activation function for incorporation within the PCC architecture 600. The implementation 800 is similar to the implementation 700, however in place of the splitters 704, 708 and the pair of HSPSs 706, a single HSPS 804 of a MRM is applied to the optical signal 613, thereby resulting in an output optical signal 804. The HSPS 804 is controlled by the electrical signal 703. Thus, the HSPS 804 implements the nonlinear activation function achieved by the EO modulator 618. Bias control is done separately.

According to some examples, pairs of tunable multiplexers and tunable demultiplexers may be used to select channels individually, rather than the full spectrum including the multiplexed noise. These tunable multiplexers and tunable demultiplexers may be used in place of the AWGs in FIG. 6-1 and may be realized, for example, using tunable ring resonators possessing a sufficient optical bandwidth to select an active channel (for example, 50-100 GHz).

Figure 9:
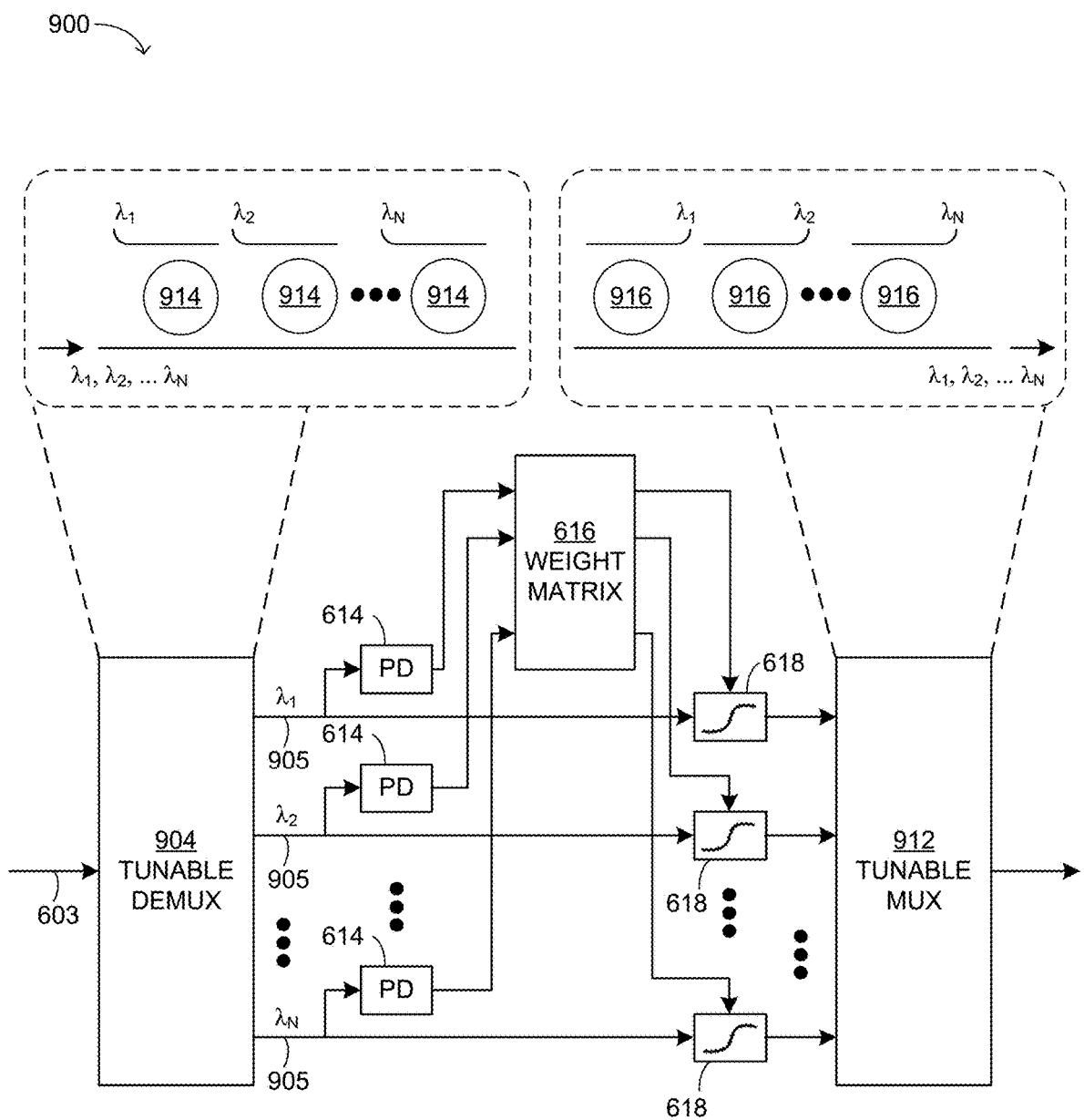
FIG. 9 illustrates an alternate implementation of a nonlinear node of the PCC architecture illustrated in FIG. 6-1.

FIG. 9 illustrates an alternate example architecture 900 for the nonlinear node 604. In this example, a tunable demultiplexer 904 consisting of N tunable ring resonators 614 replaces the AWG 612. As described with respect to FIG. 6-1, the weight matrix 616 is applied to the N electrical signals output by the N respective PDs 614, thereby resulting in the N electrical signals that are used to control the N respective EO modulators 618. In this example, a tunable multiplexer 912 consisting of N tunable ring resonators 916 replaces the AWG 620.

Polarization dependent effects of the material platforms used to implement the PCC architectures described thus far, and their individual components—such as waveguides, splitters, and phase shifters—may be mitigated using a polarization diversity approach. This may entail duplicating the PCC architecture or a portion thereof, for example, as shown by Barwicz et al. in "Polarization-transparent microphotonic devices in the strong confinement limit," *Nature Photonics* 1.1 (2007).

In general, polarization or mode diversity may be achieved using at least one splitting element configured to separate an optical signal containing a plurality of modes (including its orthogonal polarizations) into a plurality of orthogonal input signals. For each orthogonal input signal, a duplicate version of a least a portion of the PCC architecture (including photonic circuit elements and at least one electronic circuit element) may be configured to process the orthogonal input signal to generate an orthogonal output signal, thereby resulting in a plurality of orthogonal output signals corresponding to the plurality of orthogonal input signals. At least one combining element may be configured to combine the plurality of orthogonal output signals, which may ultimately result in an output optical signal in which polarization dependent effects are reduced. The following examples involve dual polarization optical signals, but the techniques may be extended to S orthogonal modes, where S is a positive integer and S≥2.

Figure 10:
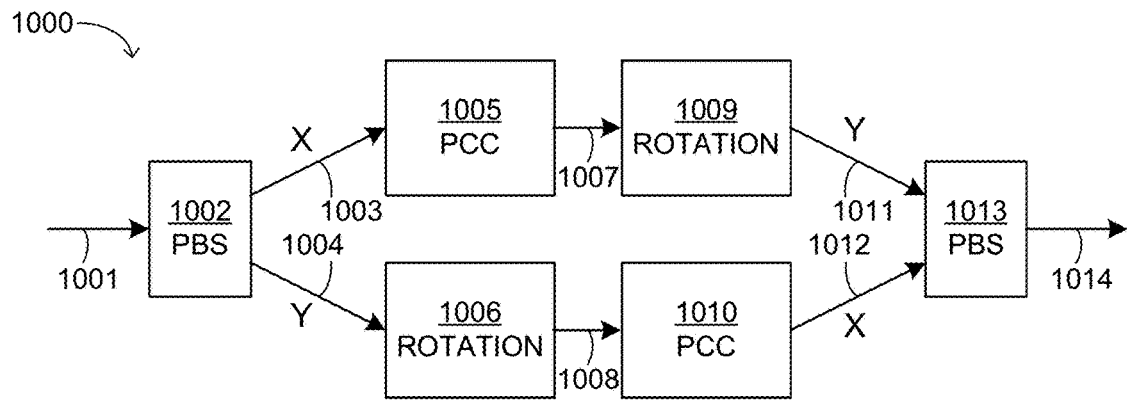
FIG. 10 illustrates a first example architecture for implementing polarization diversity.

FIG. 10 illustrates a first example architecture 1000 for implementing polarization diversity. The architecture 1000 achieves polarization diversity by duplicating the entire PCC architecture, that is, all of the photonic circuit elements and the electronic circuit element(s) comprised in the original PCC. (It is noted that the architecture 1000 itself may also be referred to as a PCC.) From a dual polarization signal 1001 output by the optical fiber to be compensated for nonlinearity (for example, a signal output by the fiber 310), a polarizing beam splitter (PBS) 1002 outputs two signals 1003 and 1004 corresponding, respectively, to the X and Y polarizations of the signal 1001. The X polarization signal 1003 may be processed by a PCC 1005, such as the PCC 600, to generate a signal 1007 which is compensated for nonlinearity in the optical fiber. The compensated signal 1007 may then undergo a rotation 1009 from the X polarization to the Y polarization, thereby resulting in a signal 1011 In parallel to the processing of the X polarization signal 1003, the Y polarization signal 1004 may undergo a rotation 1006 from the Y polarization to the X polarization, thereby resulting in a signal 1008. The signal 1008 may be processed by a PCC 1010 which is identical to the PCC 1005 (i.e., contains duplicate versions of the photonic circuit elements and the one or more electronic circuit elements of the PCC 1005), thereby resulting in a signal 1012 which is compensated for nonlinearity in the optical fiber. The signals 1011 and 1012 may be combined using a PBS 1013, thereby resulting in a dual polarization signal 1014 that is compensated for nonlinearity. Advantageously, the architecture 1000 may reduce or eliminate from the compensated signal 1014 any polarization dependent effects caused by the PCCs 1005 and 1010 as both signals 1003 and 1004 are processed in the same X polarization state.

Figure 11:
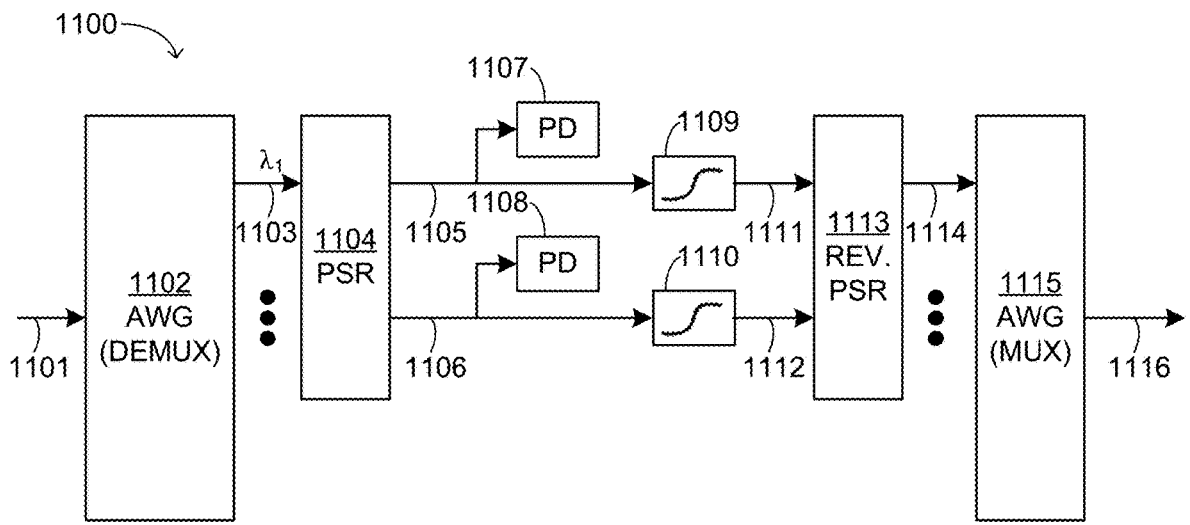
FIG. 11 illustrates a second example architecture for implementing polarization diversity.

FIG. 11 illustrates a second example architecture 1100 for implementing polarization diversity. The architecture 1100 may be implemented within the PCC itself to achieve polarization diversity. For example, the architecture 1100 may be used in place of the nonlinear node 611 in FIG. 6-1 or the nonlinear node 900 in FIG. 9. An input signal 1101, such as one of the signals 603, may be channelized by an AWG 1102, such as the AWG 612. Each channel may then undergo polarization diversity processing. For example, a signal 1103 corresponding to the wavelength $\lambda_1$ may be processed by a polarization splitter-rotator (PSR) 1104 to generate two signals 1105 and 1106 in the X polarization state corresponding, respectively, to the X and Y polarizations of the signal 1103. The signals 1105 and 1106 may be tapped by two respective PDs 1107 and 1108 to generate two respective electrical signals (not shown). These electrical signals may be used in conjunction with signals from other channels (as described previously; not shown) to control respective EO modulators 1109 and 1110. Two respective optical signals 1111 and 1112 output by the EO modulators 1109 and 1110 may be processed by a reverse PSR 1113 to generate a combined signal 1114 containing the X and Y polarizations of the processed signals 1111 and 1112, respectively. The signal 1114 may be combined with corresponding signals from other channels using an AWG 1115, such as the AWG 620. A resulting signal 1116 output by the AWG 1115 may be compensated for nonlinearity (similarly to one of the signals 605) but without the polarization dependent effects caused by the components/materials of the nonlinear node 611 or 900. In contrast to the architecture 1000 which comprises a single splitting element (i.e., the PBS 1002) and a single combining element (i.e., the PBS 1013), the architecture 1100 comprises a plurality of splitting elements (i.e., the N PSRs 1104) and a plurality of combining elements (i.e., the N reverse PSRs 1113). However, for each orthogonal input signal, only a portion of the photonic circuit elements and the electronic circuit element(s) are duplicated (i.e., the PD 1108 and the EO modulator 1110, which are duplicate versions the PD 1107 and the EO modulator 1109, respectively).

Figure 12:
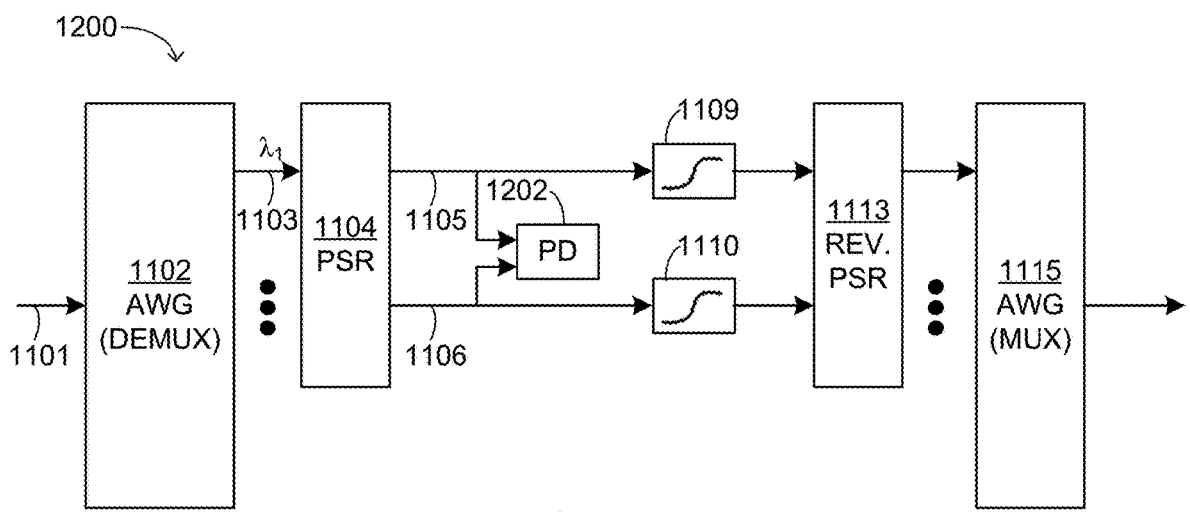
FIG. 12 illustrates a third example architecture for implementing polarization diversity.

FIG. 12 illustrates a third example architecture 1200 for implementing polarization diversity. The architecture 1200 is similar to the architecture 1100 except that the signals 1105 and 1106 corresponding, respectively, to the X and Y polarizations of the signal 1103 are tapped by a single PD 1202 to generate a single electrical signal (not shown). This electrical signal may be used in conjunction with signals from other channels (not shown) to control the respective EO modulators 1109 and 1110. Since there is no duplicate version of the PD 1202, the architecture 1200 comprises fewer PDs as compared to the architecture 1100. However, the architecture 1200 may be more difficult to calibrate, and also does not allow for a different weight for each polarization.

The nonlinearity compensation approaches described thus far may involve a potentially large number of active elements, such as the PDs and OE modulators. Depending on the WDM channel width and optical band of interest, a "chiplet" approach may be employed which replicates the active functionalities across several identical photonic integrated circuits (PICs) and electronic integrated circuits (EICs). Various PICs, implementing different functionalities (active and passive), may be joined, for example, by direct butt-coupling, fiberized connectors, photonic wirebonds, or discrete free space optics.

Is it understood that the approaches to polarization diversity described above may be extended in spirit to cover mode diversity in a fiber span, for example in current or future spatial-division multiplexing (SDM) communication links. The two orthogonal polarizations of a single-mode fiber are merely one example of separate modes needing careful handling in a PCC.

Figure 13:
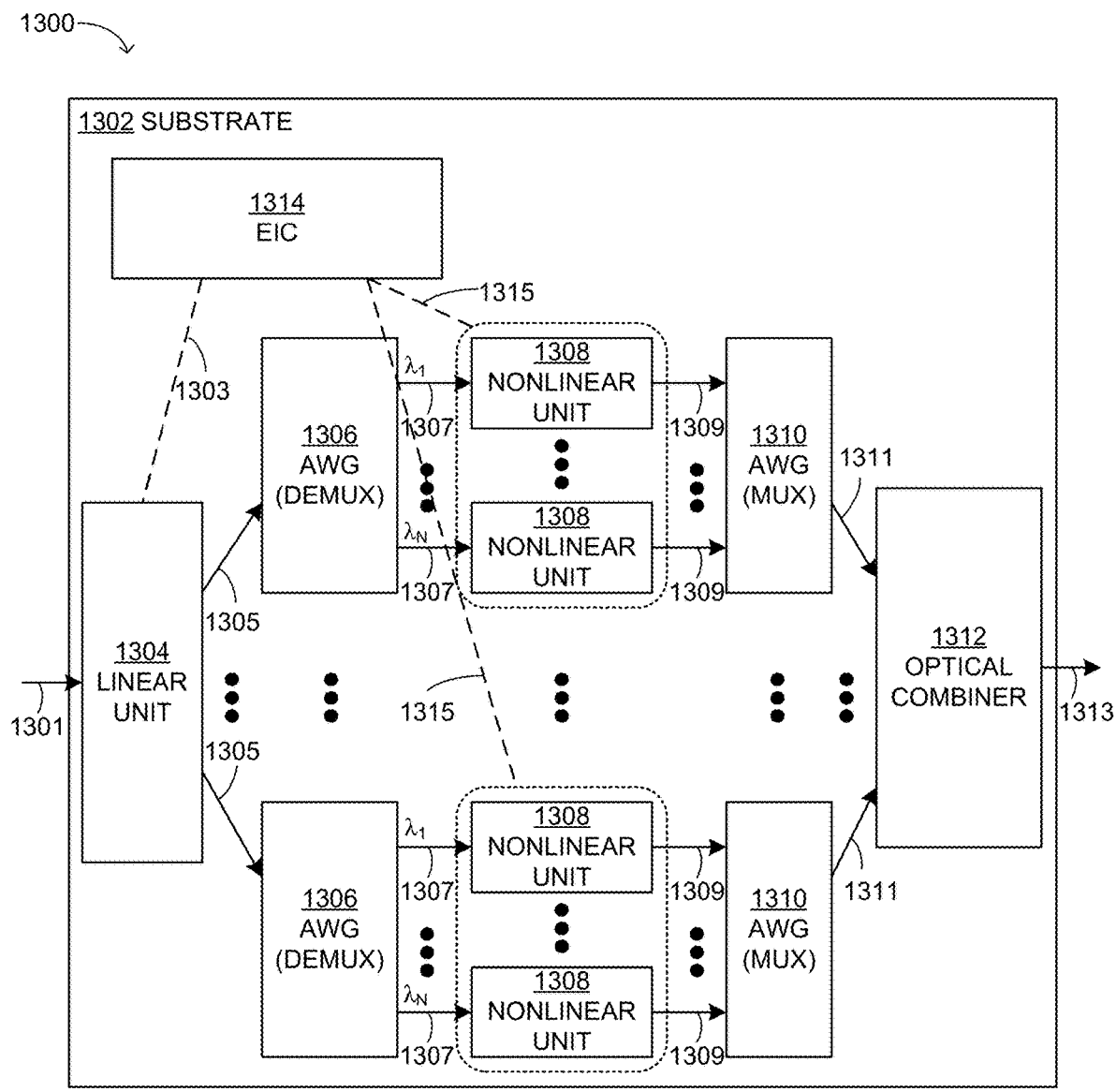
FIG. 13 illustrates an example hardware structure for implementing the PCC architecture of FIG. 6-1.

FIG. 13 illustrates an example hardware structure 1300 for implementing an ANN-based PCC architecture, such as the PCC architecture 600. The structure 1300 comprises a semiconductor substrate 1302, such as a ceramic or printed circuit board (PCB), which holds an EIC 1314 and a plurality of PICs, including a linear unit 1304, a plurality of AWGs 1306, 1310, a plurality of nonlinear units 1308, and an optical combiner 1312.

The linear unit 1304 receives a signal 1301 output by an optical fiber to be compensated, such as the signal 601. The linear unit 1304 is configured to split the signal 1301 into P signals 1305 that are linearly transformed by the application of P respective weights, where P is a positive integer and P≥2. For example, the linear unit 1304 may function as the optical splitter 602 and may also apply the weights $wi_1, \ldots, wi_P$, as described with respect to FIG. 6-1. Electrical signals from the EIC 1314 may be used to control the weights applied by the linear unit 1304, as denoted by 1303.

Each signal 1305 output by the linear unit 1304 is provided to a respective AWG 1306. The AWG 1306 acts as a demultiplexer and divides the signal 1305 into N signals 1307, where N is a positive integer and N≥2. The AWG 612 is an example of the AWG 1306.

Each signal 1307 is provided to a respective nonlinear unit 1308. The nonlinear unit 1308 is configured to apply a nonlinear activation function to the signal 1307, thereby resulting in a signal 1309. In other words, each nonlinear unit 1308 represents the portion of the nonlinear node 604 that performs the nonlinear operation. Thus, for example, the nonlinear units 1308 may, together, be configured to implement the functionality of the PDs 614, the weight matrix 616, and the EO modulators 618. Given P AWGs 1306 and N nonlinear units 1308 for each AWG 1306, there is a total of PN nonlinear units 1308. Electrical signals from the EIC 1314 may be used to control the nonlinear units 1308, as denoted by 1315. For example, the EIC 1314 may control the weight matrix 616, therefore taking the signals from the PDs 614, processing them, and sending them back to the EO modulators 618. The EIC 1314 may also ensure the proper electrical biases are applied to the PDs 614 and to the EO modulators 618.

The N signals 1309 generated by the nonlinear units 1308 associated with a given AWG 1306 are provided to an AWG 1310. Acting as a multiplexer, the AWG 1310 combines the N signals 1309 together to generate a signal 1311. The AWG 620 is an example of the AWG 1310.

The P signals 1311 generated by the P respective AWGs 1310 may be linearly transformed by the application of P respective weights, such as the weights $wf_1, \ldots, wf_P$, as described with respect to FIG. 6-1. Although not explicitly illustrated in FIG. 13, these weights may be applied by another linear unit (not shown). As previously noted, the weights applied by the linear unit(s) may be controlled by the EIC 1314, as denoted, for example, by 1303.

An optical combiner 1312 combines the P signals 1311, thereby resulting in a signal 1313 corresponding to a sum of the signals 1311. With appropriate weights set by the EIC 1314, the PCC hardware structure 1300 may be configured to generate an output signal 1313 that has reduced nonlinearity relative to the input signal 1301.

The PCC architectures described thus far have been designed using ANN-based compensation models. In other examples, per-span fiber nonlinearity compensation may be achieved using alternative PCC architectures based on analytical equations. For example, a PCC architecture may be designed based on the Regular Perturbation Method (RPM) for modeling fiber nonlinearity, where the RPM is an approximation of the Split Step Fourier Method (SSFM). It is contemplated that an RPM-based PCC architecture may be more targeted and efficient for fiber nonlinearity compensation than ANN-based PCC architectures.

Figure 14:
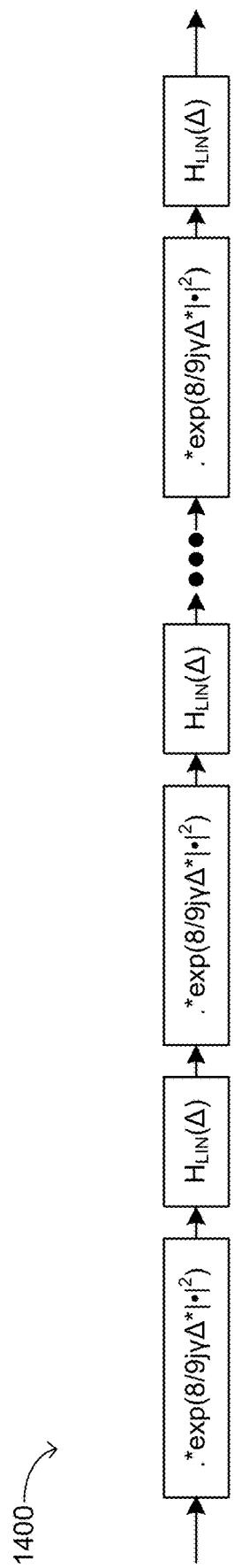
FIG. 14 illustrates an example fiber model based on the Split Step Fourier Method (SSFM)

FIG. 14 illustrates an example fiber model 1400 based on the SSFM. The fiber nonlinearity is modeled by a series of alternating linear and nonlinear transfer functions, where each pair of linear and nonlinear transfer functions represent the dispersion and Kerr effects, respectively, in the same small segment of optical fiber. As illustrated in FIG. 14, each linear transfer function is denoted by $H_{LIN}(\Delta)$ and each nonlinear transfer function is denoted by $\cdot * \exp(8/9 j \gamma \Delta * |\cdot|^2)$, where $\Delta$ denotes the length of the small segment of the optical fiber, where $\gamma$ denotes the nonlinear coefficient, where $\cdot *$ denotes element-wise multiplication, where $*$ denotes multiplication, and where $\bullet$ denotes the input signal. The optical signal is modeled to be transmitted through the series of pairs of linear and nonlinear transfer functions in sequence. Thus, the transfer functions that are later in the series are applied to a signal that is already distorted by the transfer functions that were applied earlier in the series.

In contrast to the SSFM, the RPM models fiber nonlinearity as a small perturbation, such that only nonlinear noise generated by the signal is considered, while nonlinear noise generated by nonlinear noise may be ignored. Therefore, according to the RPM, the nonlinear transfer functions may be applied in parallel, and then linearly combined together at the output. In *"End-to-End Deep Learning of Long-Haul Coherent Optical Fiber Communications via Regular Perturbation Model,"* 2021 European Conference on Optical Communication (ECOC), IEEE, 2021, Neskorniuk et al. demonstrated that a three-stage RPM may offer an accurate approximation of the SSFM around a span launch power corresponding to the peak incremental SNR (for example, in the vicinity of the peak of the curve shown in FIG. 2), which may correspond to the power range of interest, but also may be implemented in parallel stages/branches.

Figure 15:
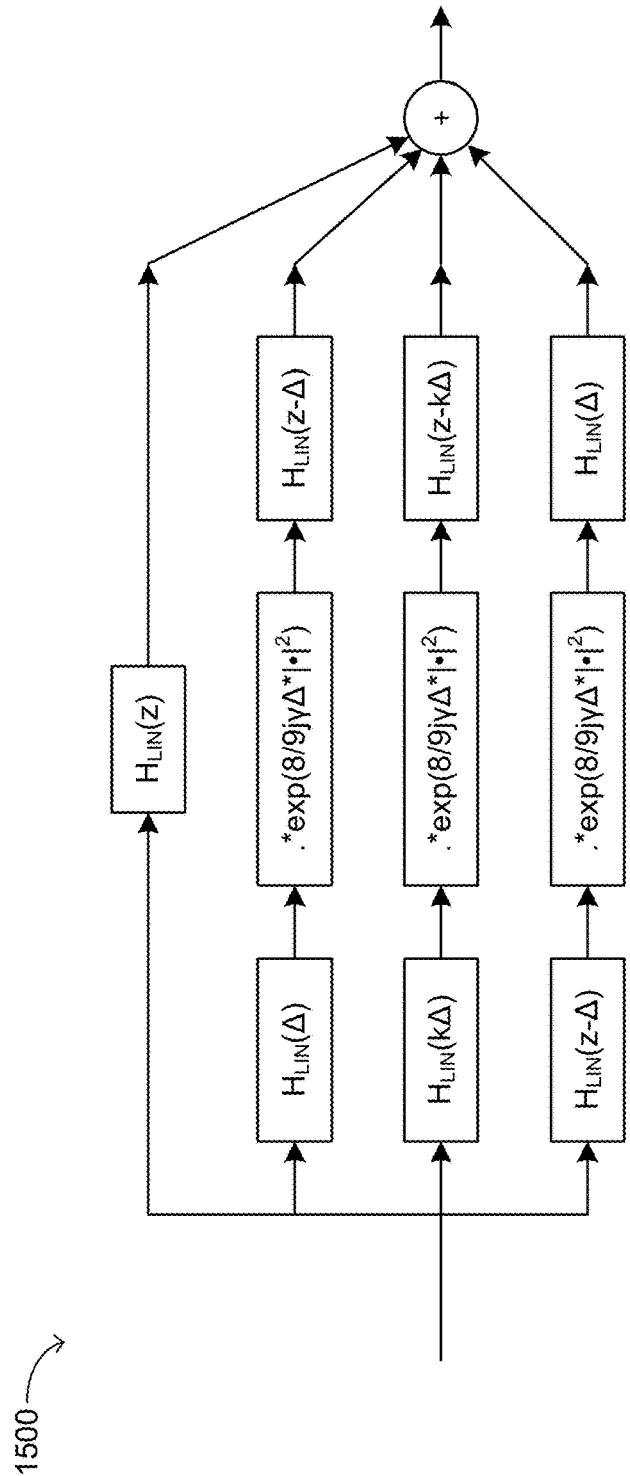
FIG. 15 illustrates an example fiber model based on the Regular Perturbation Method (RPM) using three stages.

FIG. 15 illustrates an example fiber model 1500 based on the RPM using three stages/branches. From the bottom up, the three stages/branches emulate the nonlinearity products generated at distances $\Delta$, $k\Delta$ and $z-\Delta$, respectively, where $\Delta$ is a small number representing a small piece of the fiber, z is the total length of the fiber and $k\Delta$ is a distance between $\Delta$ and $z-\Delta$. The two linear transfer functions before and after the nonlinear transfer functions in each stage/branch are to ensure the signals get the same amount of dispersion at $\Delta$, $k\Delta$ and $z-\Delta$, from distance 0 (i.e., the proximal end of the fiber) to the nonlinear transfer function and from the nonlinear transfer function to distance z (i.e., the distal end of the fiber). The ability to accurately model a fiber using the RPM with a few stages, as demonstrated by Neskorniuk et al., makes RPM-based modeling a promising solution for creating the inverse fiber transfer function to cancel the fiber nonlinear distortion.

Figure 16:
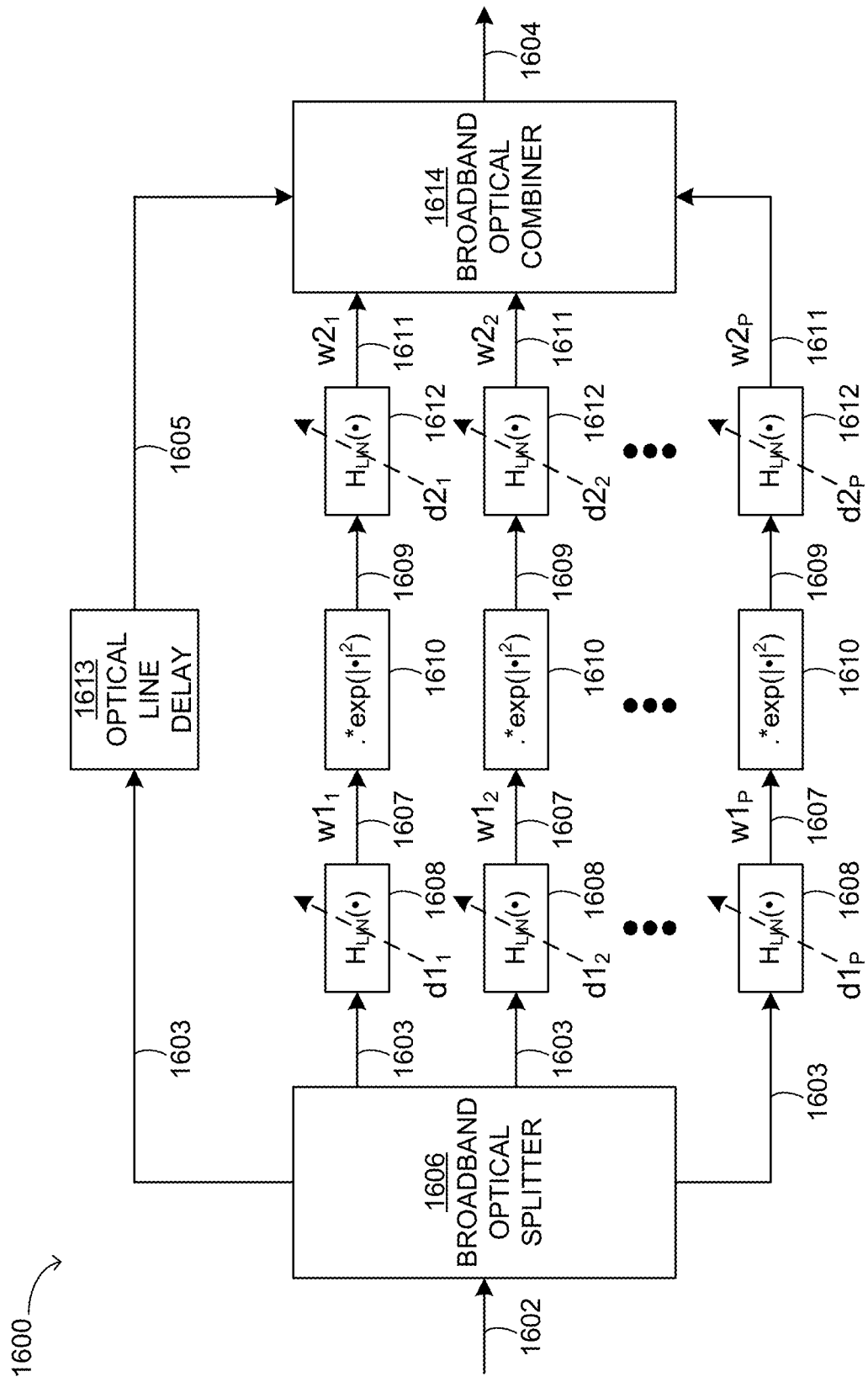
FIG. 16 illustrates an example PCC architecture based on the RPM.

FIG. 16 illustrates an example PCC architecture 1600 based on the RPM.

A signal 1602 represents the output of an optical fiber to be compensated for nonlinearity. The signal 1602 is input to a broadband optical splitter 1606, which distributes the power of the signal 1602 over a plurality of signals 1603.

A first plurality of tunable dispersion nodes 1608, each represented by a linear transfer function $H_{LIN}(\bullet)$, is applied to all but one of the plurality of signals 1603 to generate a respective plurality of signals 1607, where each dispersion node 1608 is controlled by a respective bias. For example, where the splitter 1606 generates P+1 signals 1603, where P is a positive integer and P≥2, the PCC 1600 may comprise P dispersion nodes 1608 having P respective biases denoted by $d1_1, \ldots d1_P$ (or $d1_k$ for $k=1 \ldots P$). An optical line delay 1613 may be applied to one of the P+1 signals 1603, thereby resulting in a delayed signal 1605. The purpose of the optical line delay 1613 is to ensure that the signal 1605 is delayed by the same amount of time as the signals in the other stages/branches of the PCC 1600 (which experience delays due to the various optical components that implement the linear and nonlinear transfer functions).

A plurality of nonlinear nodes 1610, each represented by a nonlinear transfer function $\cdot * \exp(|\bullet|^2)$, is applied to the plurality of signals 1607 to generate a respective plurality of signals 1609. The nonlinearity may be tuned by respective weights, denoted by $w1_1, \ldots, w1_P$ (or $w1_k$ for $k=1 \ldots P$), which are applied before the input of the nonlinear nodes 1610.

A second plurality of tunable dispersion nodes 1612 is applied to the plurality of signals 1609 to generate a respective plurality of signals 1611. The dispersion nodes 1612 are controlled by respective biases denoted by $d2_1, \ldots, d2_P$ (or $d2_k$ for $k=1 \ldots P$).

The plurality of signals 1611 may be tuned by a respective plurality of weights denoted by $w2_1, \ldots, w2_P$ (or $w2_k$ for $k=1 \ldots P$). The weighted signals 1611 are combined by a broadband optical combiner 1614 to yield a signal 1604. Although not explicitly illustrated in FIG. 16, the phase of each weighted signal 1611 may be stabilized by fabrication or by active control, for example by phase shifters.

As described with respect to the PCC 500, it may be possible to configure the PCC 1600 to compensate for nonlinearity in the signal 1602. In this case, the operation of the PCC 1600 is dictated by the weights $w1_k$ and $w2_k$, for $k=1 \ldots P$, and also by the biases $d1_k$ and $d2_k$, for $k=1 \ldots P$. Since the same process may be used to train both the biases and the weights, the biases $d1_k$ and $d2_k$, for $k=1 \ldots P$, may herein be referred to as weights, for simplicity. Advantageously, fewer weights may need to be trained for the PCC 1600 than for the PCC 500. For example, for the PCC 1600 with P=3, there are 12 weights to train. This is contrasted with the PCC 500 which, as noted previously, requires 44 weights to be trained.

According to some examples, implementation of the PCC 1600 may employ a similar WDM approach as described with respect to the channelized ANN architecture of the PCC 600, for example. This WDM parallelism may replicate for each channel the various operations described with respect to FIG. 16 (aside from the pure optical delay 1613, which may be done on its own in a broadband manner).

Figure 17:
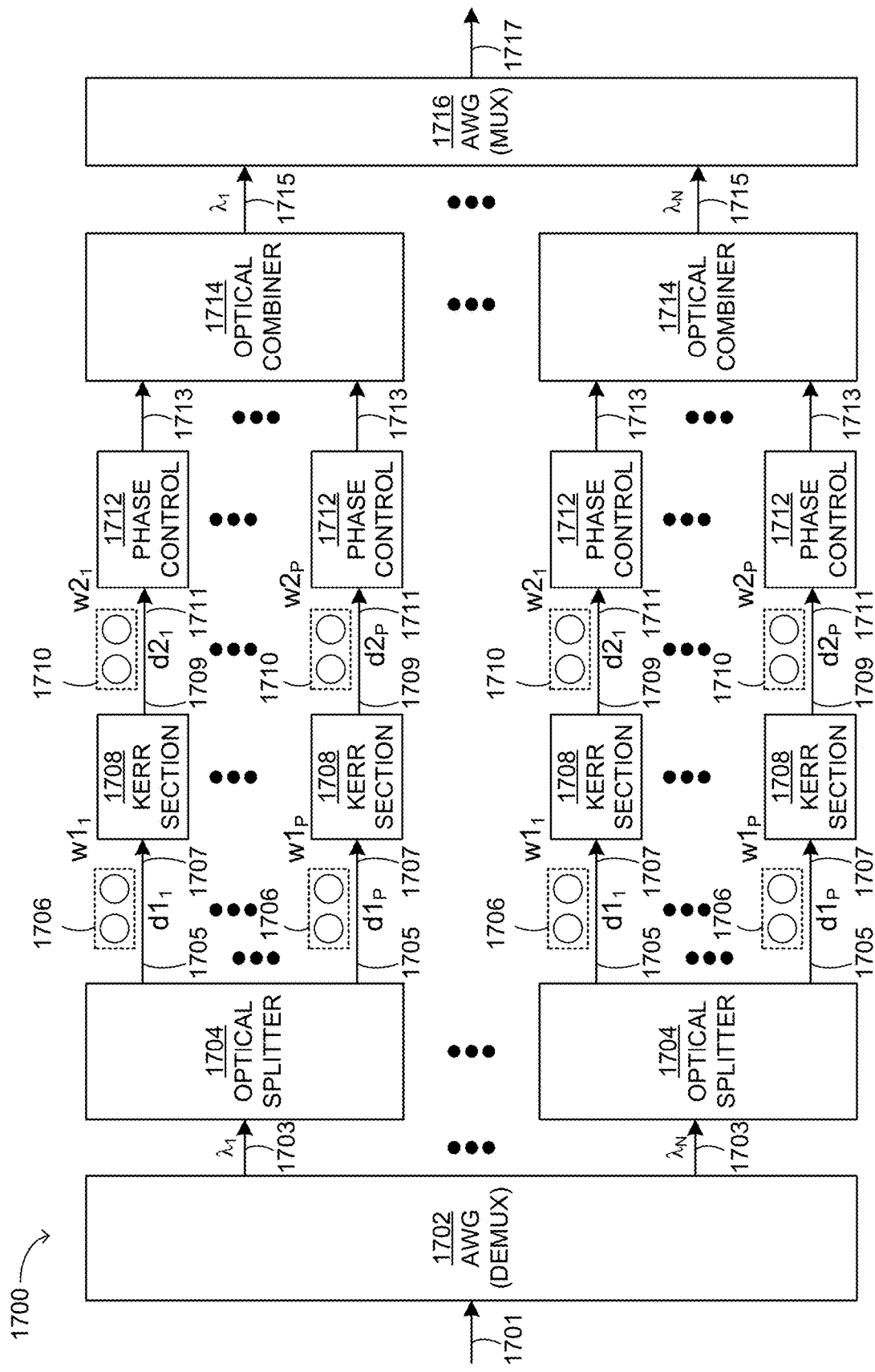
FIG. 17 illustrates an example PCC structure based on the RPM and incorporating WDM parallelism.

FIG. 17 illustrates an example PCC architecture 1700 based on the RPM and incorporating WDM parallelism. Although not explicitly illustrated, it should be understood that an EIC (similar to the EIC 1314) is configured to control biases and weights of various elements of the PCC architecture 1700.

A signal 1701 represents the output of an optical fiber to be compensated for nonlinearity. The signal 1701 is input to an AWG 1702, serving as a demultiplexer, which divides the spectrum of the signal 1701 into a plurality of slices or channels, resulting in N signals 1703, where N is a positive integer and N≥2. Each signal 1703 is provided to a respective optical splitter 1704, which in turn generates a plurality of signals 1705. To each signal 1705, a cascaded all-pass ring resonator 1706 (implementing the functionality of the dispersion node 1608) may be applied, thereby resulting in a signal 1707. Where the optical splitter 1704 generates P signals 1705, P being a positive integer equal to or greater than two, there are P corresponding resonators 1706 having P respective biases denoted by $d1_1, \ldots, d1_P$.

To each signal 1707, a Kerr section (implementing the functionality of the nonlinear node 1610) may be applied, thereby resulting in a signal 1709. For example, given P signals 1709, there are P corresponding Kerr sections 1708. As described with respect to the nonlinear nodes 1610, the nonlinearity the P Kerr sections 1708 may be tuned by P respective weights, denoted by $w1_1, \ldots, w1_P$ which are applied before the input of the Kerr sections 1708.

To each signal 1709, a cascaded all-pass ring resonator 1710 (implementing the functionality of the dispersion node 1612) may be applied, thereby resulting in a signal 1711. For example, where the splitter 1704 generates P signals 1705, P being a positive integer equal to or greater than two, there are P corresponding resonators 1710 having P respective biases denoted by $d2_1, \ldots, d2_P$.

The plurality of signals 1711 may be tuned by a respective plurality of weights denoted by $w2_1, \ldots, w2_P$. Additionally, phase control 1712 may be applied to each signal 1711, thereby resulting in a respective weighted, phase-controlled signal 1713. The P signals 1713 generated for a given signal 1703 are combined by a respective optical combiner 1714 to yield a signal 1715. Where there are N signals 1703, there will be N respective signals 1715, each corresponding to a different slice of the spectrum. These N signals 1715 are input to an AWG 1716, serving as a multiplexer, which yields a signal 1717.

Because a PCC architecture that emulates the RPM is able to achieve nonlinearity compensation without any optical-to-electrical or electrical-to-optical conversion, the WDM channels may span a much larger optical bandwidth than is possible with the ANN-based architecture. However, since there is expected to be dependence of waveguide characteristics over wavelength (i.e., dispersion), for waveguides specifically optimized for their nonlinearity, it is still advantageous to use WDM parallelism when the optical band of interest is large (for example, covering the entire C-band). Nevertheless, one channel of this RPM-based architecture may be expected to encompass several slices of a regular dense WDM grid as used for coherent channels.

The PCC 1700 uses cascaded all-pass resonators 1706, 1710, which have been shown to realize dispersion states efficiently and compactly in an integrated platform, for example, as described by Madsen et al. in "Multistage dispersion compensator using ring resonators," Optics Letters 24.22 (1999). However, the free-spectral range (FSR) of the rings may impose a maximum optical span to the WDM channels. The dispersion states may alternatively be realized less compactly in feed-forward Mach-Zehnder lattices as described by Suzuki et al. in "Low-loss integrated-optic dynamic chromatic dispersion compensators using lattice-form planar lightwave circuits," *Optical Fiber Communication Conference*, Optical Society of America, 2003, or by Takiguchi et al. in "Variable group-delay dispersion equalizer using lattice-form programmable optical filter on planar lightwave circuit," *IEEE Journal of Selected Topics in Quantum Electronics* 2.2 (1996).

The Kerr nonlinearity in the Kerr section 1610 may be enhanced in telecommunication bands of interest by using a specific material platform with a high nonlinear figure of merit (ratio of nonlinear index to nonlinear absorption) such as various SiN, SiON, or SiC mixtures and by tailoring the waveguide geometry to maximize the intensity, through a minimization of the effective mode area.

Implementing the splitting and the recombination within each WDM slice provides a degree of parallelism that may help stabilize the interferometric recombination by limiting non-idealities related to waveguide dispersion, as the optical bandwidth is more limited. It is noted that, even though the splitting may be realized in a broadband manner, placing the optical splitter before the AWG may introduce undesirable waveguide crossings.

Polarization dependent effects associated with the PCC architecture 1700 may be mitigated using a polarization diversity scheme. For example, as described with respect to FIGS. 10-12, polarization diversity may be achieved by duplicating at least a portion of the PCC architecture 1700.

Whether the structure of a PCC is based on machine learning or analytical equations, compensation of fiber nonlinearity by the PCC is achieved by configuring the weights applied to the PCC such that the PCC accurately models the inverse of the fiber transfer function. The fiber transfer function is determined by a set of fiber characteristics, such as dispersion (including the zero-dispersion wavelength, $\lambda_0$, and dispersion slope, S), nonlinear coefficient $\gamma$, fiber length L, and fiber loss coefficient $\alpha$. Thus, given information about the fiber characteristics, it is possible to determine the weights of the PCC. For a given fiber, the fiber characteristics may be acquired from a manufacturer, from provisioning by the network operator or may be measured. Advantageously, built-in instrumentation in optical line systems, for example the Reconfigurable Line System (RLS) platform provided by Ciena Corporation, is capable of measuring all the above-mentioned fiber parameters for each span in a multi-span system. Therefore, the weights of each PCC may be pre-trained for covering various combinations of fiber parameters by simulation and/or measurement in the factory.

Figure 18:
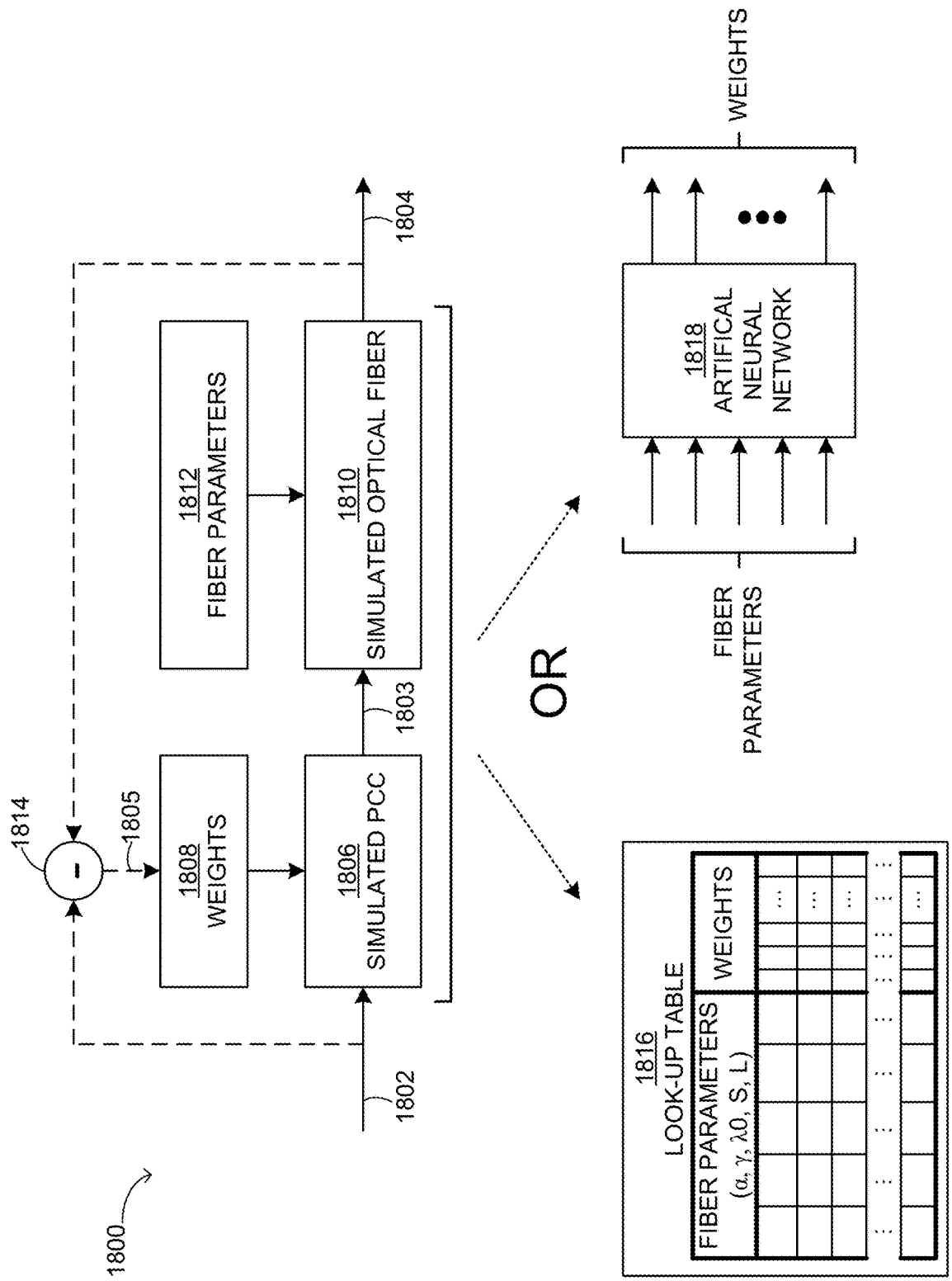
FIG. 18 illustrates an example simulation process for PCC weight training.

FIG. 18 illustrates an example simulation process 1800 for PCC weight training. The simulation process 1800 involves a simulated PCC 1806 controlled by weights 1808, and a simulated optical fiber 1810 characterized by fiber parameters 1812. In the case where the simulated PCC 1806 is designed to represent the PCC 500, the weights 1808 may comprise the weights $wi_k$ for k=1 . . . P, $wo_k$ for k=1 . . . M, and $wf_k$ for k=1 . . . M. In the case where the simulated PCC 1806 is designed to represent the PCC 600, the weights 1808 may comprise the weights $w1_k$ and $wf_k$, for k=1 . . . P and the weight matrix 616. In the case where the simulated PCC 1806 is designed to represent the PCC 1600 or 1700, the weights 1808 may comprise the weights $m1_k$, $w2_k$, $d1_k$, and $d2_k$ for k=1 . . . P. The fiber parameters 1812 may comprise the zero-dispersion wavelength $\lambda_0$, the dispersion slope S, the nonlinear coefficient $\gamma$, the fiber length L, and the fiber loss coefficient $\alpha$. The process 1800 may be carried out entirely by simulation, for example, during the design phase when time consumption and computational complexity are not strictly limited. Accordingly, the simulated optical fiber 1810 may be modeled using the SSFM, which is more computationally taxing but may provide more accuracy than the RPM.

For a given set of values chosen for the fiber parameters 1812, the simulated PCC 1806 is applied to an input signal 1802. The input signal 1802 may cover the entire signal band of interest, for example, the C-band or the entire C+L band. The simulated PCC 1806 outputs a signal 1803, which is input to the simulated optical fiber 1810, thereby resulting in an output signal 1804. A difference operation 1814 may be used to generate an error signal 1805 which represents the difference between the signal 1804 (i.e., the current output) and the signal 1802 (i.e., the desired output). In a series of iterations, the weights 1808 may be adjusted based on the value of the error signal 1805. The values of the weights that give the smallest value of the error signal 1805 (or a value that is lower than some predetermined threshold) may be recorded in association with the current set of values used for the fiber parameters 1812.

Simulations of this nature may be repeated using different combinations of values for the fiber parameters 1812. For each different combination of fiber parameters 1812, a corresponding set of weights may be determined. The repeated simulations may be used to generate a mapping between the sets of fiber parameters and the weights. This mapping may be used for calibrating manufactured PCCs, as will be described further with respect to FIG. 19.

According to one example, the mapping between the fiber parameter combinations and the PCC weights may be realized by a look-up table (LUT) such as the LUT 1816, in which different sets of fiber parameter combinations are stored in association with the weights recorded during the simulation process 1800. By repeating the simulation process 1800 for many different combinations of the fiber parameters 1812, it is possible to generate a LUT that covers a large number of cases (i.e., possible fiber characteristics). If a particular fiber parameter combination is not explicitly recorded in the LUT, the corresponding weights for that particular combination may be ascertained by interpolating among the values that are recorded in the weights LUT.

According to another example, the mapping between the fiber parameter combinations and the PCC weights may be realized by machine learning. For example, an ANN, such as the ANN 1818, may be trained to predict the values of the weights (i.e., the ANN outputs) from the values of fiber parameters (i.e., the ANN inputs). Accordingly, the ANN 1818 may be able to generate weights for any fiber parameter combination, even if that combination was not among the simulated cases.

Figure 19:
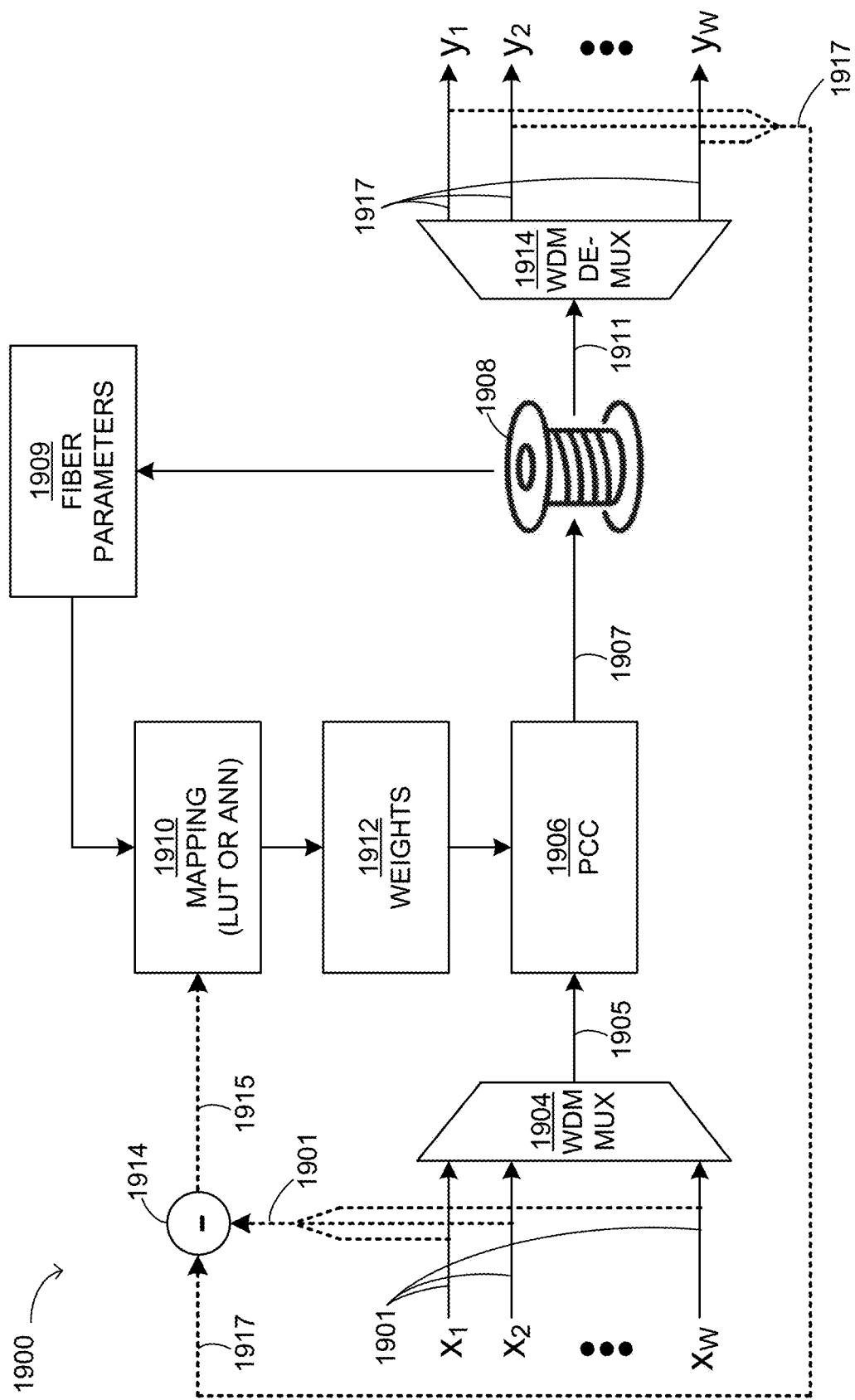
FIG. 19 illustrates an example calibration process for PCC weight training.

FIG. 19 illustrates an example calibration process 1900 for PCC weight training. The calibration process 1900 involves fine tuning the mapping generated during the simulation process 1800 by accounting for differences between the characteristics of a simulated PCC and a manufactured PCC.

The calibration process 1900 involves a test setup wherein a plurality of coherent optical signals 1901, denoted by $x_k$ for k=1 . . . W, where W is a positive integer and W≥2, covering a signal band of interest (for example, the entire C-band or the entire C+L band) is combined by a WDM multiplexer 1904 into an optical signal 1905. The optical signal 1905 is input to a manufactured PCC 1906, which is controlled by weights 1912. In the case where the PCC 1906 comprises the PCC 500, the weights 1912 may comprise the weights $wi_k$ for k=1 . . . P, $wo_k$ for k=1 . . . M, and $wf_k$ for k=1 . . . M. In the case where the PCC 1906 comprises the PCC 600, the weights 1912 may comprise the weights $wi_k$ and $wf_k$, for k=1 . . . P and the weight matrix 616. In the case where the PCC 1906 comprises the PCC 1600 or 1700, the weights 1912 may comprise the weights $w1_k$, $w2_k$, $d1_k$, and $d2_k$ for k=1 . . . P.

An optical signal 1907 output by the PCC 1906 is input to a test spool of optical fiber 1908. The test spool 1908 is characterized by various fiber parameters 1909, including the zero-dispersion wavelength $\lambda_0$, the dispersion slope S, the nonlinear coefficient $\gamma$, the fiber length L, and the fiber loss coefficient $\alpha$. The fiber parameters 1909 may be determined from values previously provisioned to the test spool 1908 (i.e., by the manufacturer of the test spool 1908) or from separate measurements performed on the test spool 1908 prior to the calibration process 1900. The fiber parameters 1909 may be used in combination with a mapping 1910 between fiber parameter combinations and corresponding PCC weights in order to select the values of the weights 1912 used to control the PCC 1906. Initially, the mapping 1910 may be identical to a mapping generated during the simulation process 1800 for a simulated PCC corresponding to the manufactured PCC 1906. For example, during a first iteration of the process 1900, the mapping 1910 may comprise the LUT 1816 or the ANN 1818. In this manner, the weights 1912 initially used to control the PCC 1906 may be dictated by the results of the simulation process 1800 alone. During this first iteration of the process 1900, the test spool 1908 may output an optical signal 1911 that is at least partially compensated for nonlinearity. Additional compensation of nonlinearity may be achieved in subsequent iterations of the process 1900 by using the output signal 1911 to fine tune the mapping 1910. For example, a WDM demultiplexer 1914 may be applied to the output signal 1911, thereby resulting in a plurality of optical signals 1917, denoted by $y_k$ for k=1 . . . W, where W is a positive integer and W≥2. The output signal 1917 at each of the W wavelengths may be compared to the respective input signal 1901 at each of the W wavelengths. For example, a difference operation 1914 may be applied to the signals 1901 and the signals 1917, thereby resulting in a difference signal 1915 representing $(y_k - x_k)$ for k=1 . . . W. The difference signal 1915 may be used to adjust the mapping 1910 in a manner that reduces the magnitude of the difference signal 1915 in a subsequent iteration of the calibration process 1900. Multiple iterations of this process may be performed so as to minimize the difference signal 1915 (or ensure that the difference signal 1915 is lower than a predefined threshold). For example, if the mapping 1910 comprises a LUT, such as the LUT 1816, the difference signal 1915 may be used to adjust or modify the particular row of the LUT that corresponds to the fiber parameters 1909 of the current test spool 1908. Fine tuning of the LUT may be achieved by testing only a limited number of fiber spools. It is contemplated that untested rows of the LUT may be adjusted based on interpolation between tested rows. Where the mapping 1910 comprises an ANN, such as the ANN 1818, transfer learning may be used to adjust the ANN, where the ANN is trained with simulation of as many fiber characteristic combinations as possible and then adjusted based on a few measurements in the factory.

Figure 20:
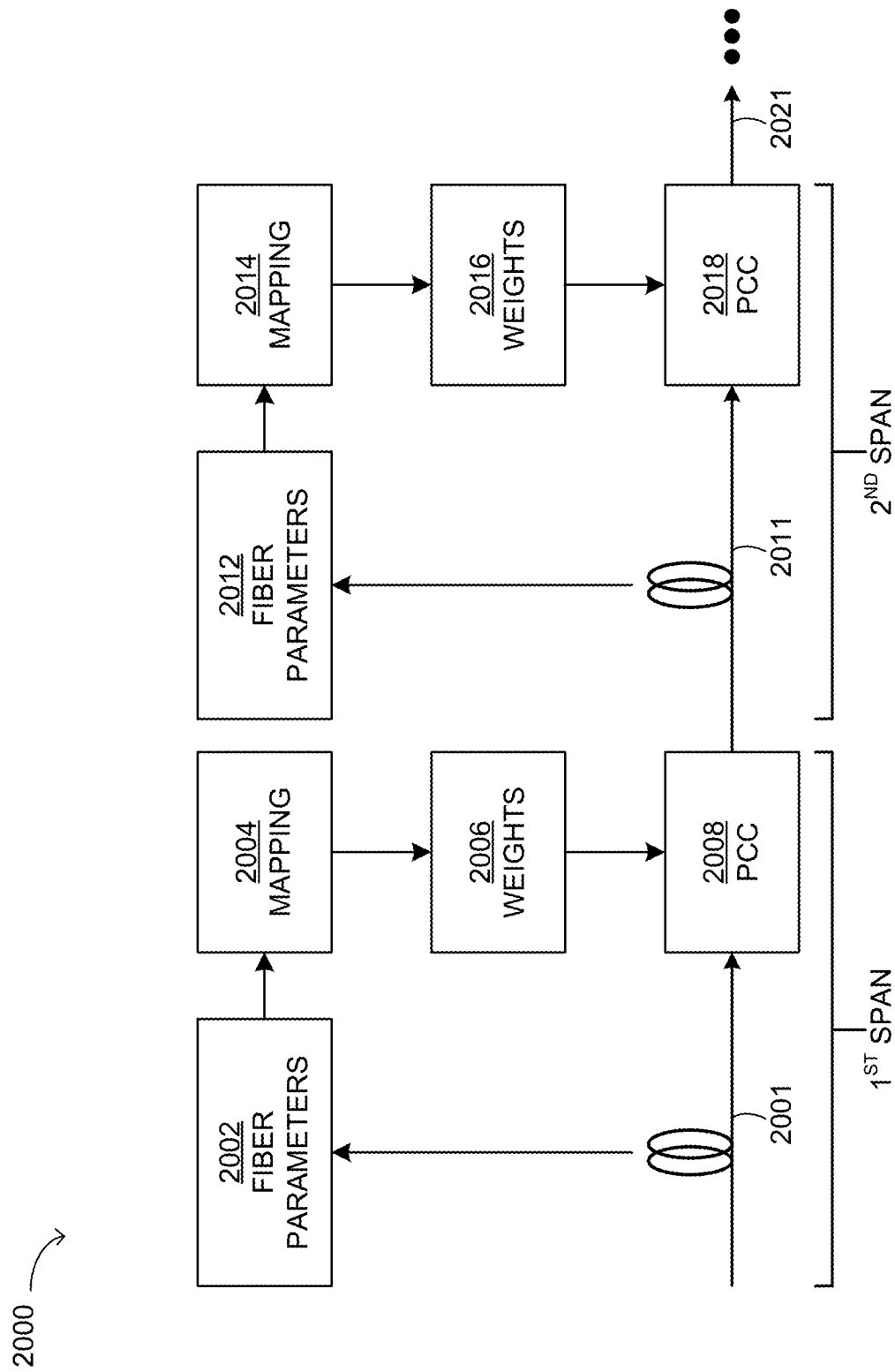
FIG. 20 illustrates a third example multi-span link comprising integrated PCCs configured for per-span nonlinearity compensation.

FIG. 20 illustrates a third example multi-span link 2000 comprising integrated PCCs configured for per-span nonlinearity compensation.

The link 2000 comprises a plurality of spans, including a first span and a second span. The first span comprises a length of optical fiber 2001 and an integrated PCC 2008. The second span comprises a length of optical fiber 2011 and an integrated PCC 2018. The optical fibers 2001 and 2011 are characterized by respective sets of fiber parameters 2002 and 2012. In some examples, the fiber parameters 2002, 2012 may be measured from the respective fibers 2001, 2011 using built-in (in-skin) instrumentation, for example, as described by Pei et al. in U.S. Pat. No. 11,139,633. In other examples, the fiber parameters 2002, 2012 may be obtained from values provisioned by the fiber manufacturer or network operator.

For each of the PCCs integrated in the link 2000, there exists a respective mapping between possible combinations of fiber parameters and the corresponding weights to be applied to the PCC. Each mapping may be generated using the simulation process 1800 and the calibration process 1900. In this example, the PCC 2008 is associated with a mapping 2004, which may comprise a LUT or ANN that was initially generated by performing the simulation process 1800 on a simulated version of the PCC 2008 (and optionally refined by performing the calibration process 1900 on the PCC 2008). Similarly, the PCC 2018 is associated with a mapping 2014, which may comprise a LUT or ANN that was initially generated by performing the simulation process 1800 on a simulated version of the PCC 2018 (and optionally refined by performing the calibration process 1900 on the PCC 2018).

In operation, each integrated PCC is controlled by weights that are determined by (i) the parameters of the target fiber to be compensated and (ii) the parameters-to-weights mapping that is associated with that particular PCC. Thus, given knowledge of the fiber parameters 2002 of the fiber 2001 (either through measurement or provisioning by the fiber manufacturer or network operator), the mapping 2004 is used to determine the weights 2006 to be applied to the PCC 2008 in order to compensate for nonlinearity of the fiber 2001 (i.e., the target fiber of the PCC 2008). In this manner, the PCC 2008 may be configured to output, into the optical fiber 2011 of the second span of the link 2000, an optical signal with reduced nonlinearity relative to the nonlinearity in the optical signal received from the fiber 2001 (i.e., the signal input to the PCC 2008). Similarly, the PCC 2018 may be configured (using the fiber parameters 2012 of the fiber 2011 and the mapping 2014) to output, into an optical fiber 2021 of a third span of the link 2000, an optical signal with reduced nonlinearity relative to the nonlinearity in the optical signal received from the fiber 2011 (i.e., the signal input to the PCC 2018). The ability to obtain weights of each integrated PCC based on parameters of the target fiber and the pre-trained parameters-to-weights mapping, instead of requiring real-time training with the transmitter and receiver signals in electrical domain, is a key enabler of applying the integrated PCC for per span fiber nonlinearity compensation in a multi-span optical system.

Because the mapping associated with any given PCC may be generated in advance of integrating the PCC in a multi-span link (using the simulation process 1800 and, optionally, the calibration process 1900), there is no need to perform any weight training of the PCC in real time. This feature enables the PCC to be used for per-span nonlinear compensation in a multi-span link.

Although not explicitly illustrated in FIG. 3, 4, 19, or 20, it is contemplated that PCCs configured for pre-compensation or post-compensation of per-span fiber nonlinearity may be integrated within network elements of the spans. In one example, a PCC may be integrated in the mid-stage of an EDFA of a given span. For example, the PCC may replace the Gain Flattening Filter (GFF) in a standard EDFA design, and the PCC may be configured to compensate for both fiber nonlinearity and EDFA gain ripples. An advantage of placing the PCC between the two stages of the EDFA is that this configuration may minimize the impact of the insertion loss introduced by the PCC. This is because the second stage of the EDFA is usually capable of generating more gain than the gain it usually operates at in normal conditions without significant penalty of the noise figure if the mid-stage loss is larger.

Two example EDFA architectures will now be described with respect to FIGS. 21 and 22, each comprising an integrated PCC. Either one of these EDFA architectures may be substituted for each of the amplifiers 107 to achieve per-span nonlinearity compensation in the link 103 in FIG. 1.

Figure 21:
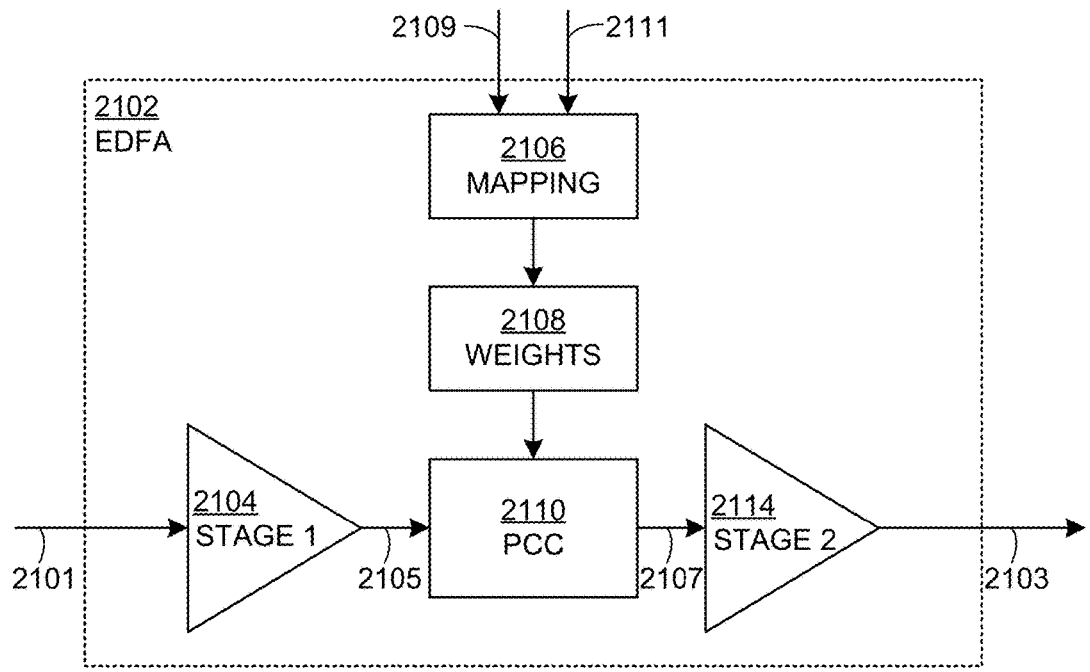
FIG. 21 illustrates a first example erbium-doped fiber amplifier (EDFA) comprising an integrated PCC configured for nonlinearity compensation in a single span.

FIG. 21 illustrates a first example EDFA 2102 comprising an integrated PCC 2110 configured for nonlinearity compensation in a single span. Given an input optical signal 2101, the EDFA 2102 generates an output optical signal 2103. Where the EDFA 2102 is configured for nonlinearity pre-compensation of a target fiber, the output optical signal 2103 represents the signal provided to the target fiber. Where the EDFA 2102 is configured for nonlinearity post-compensation of a target fiber, the input optical signal 2101 represents the signal received from the target fiber.

The PCC 2110 is positioned between a first amplification stage 2104 and a second amplification stage 2114. Thus, the PCC 2110 receives an optical signal 2105 output by the first amplification stage 2104, and the PCC 2110 outputs an optical signal 2107 which is input to the second amplification stage 2114.

The PCC 2110 is associated with a mapping 2106 which is used to determine weights 2108 to be applied to the PCC 2110. Similarly to the mapping 2004, the mapping 2106 relates various combinations of fiber parameters to their respective PCC weights, such that information about the parameters of the target fiber may be used in conjunction with the mapping 2004 to select the appropriate weights 2108 to apply to the PCC 2110 in order to compensate for fiber nonlinearity. However, in the EDFA 2102, the PCC 2110 also serves the function of a GFF. Thus, the weights 2108 applied to the PCC 2110 configure the PCC 2110 to compensate for both fiber nonlinearity and spectrum ripple. It is contemplated that the simulation process 1800 and the calibration process 1900 may be modified to take into account desired properties of the EDFA. For example, target EDFA GFF spectra may be included as part of the parameters in the simulation process 1800, and the LUT or ANN of an EDFA with a specific target GFF spectrum may be adjusted based on the measurements performed during the calibration process 1900. The mapping 2106 generated by the modified processes 1800, 1900 may relate various fiber parameters and various GFF spectra to their respective PCC weights. Thus, a given set of fiber parameters 2109 and a target GFF spectrum 2111 may be used in conjunction with the mapping 2106 to select of the weights 2108 to be applied to the PCC 2110.

Figure 22:
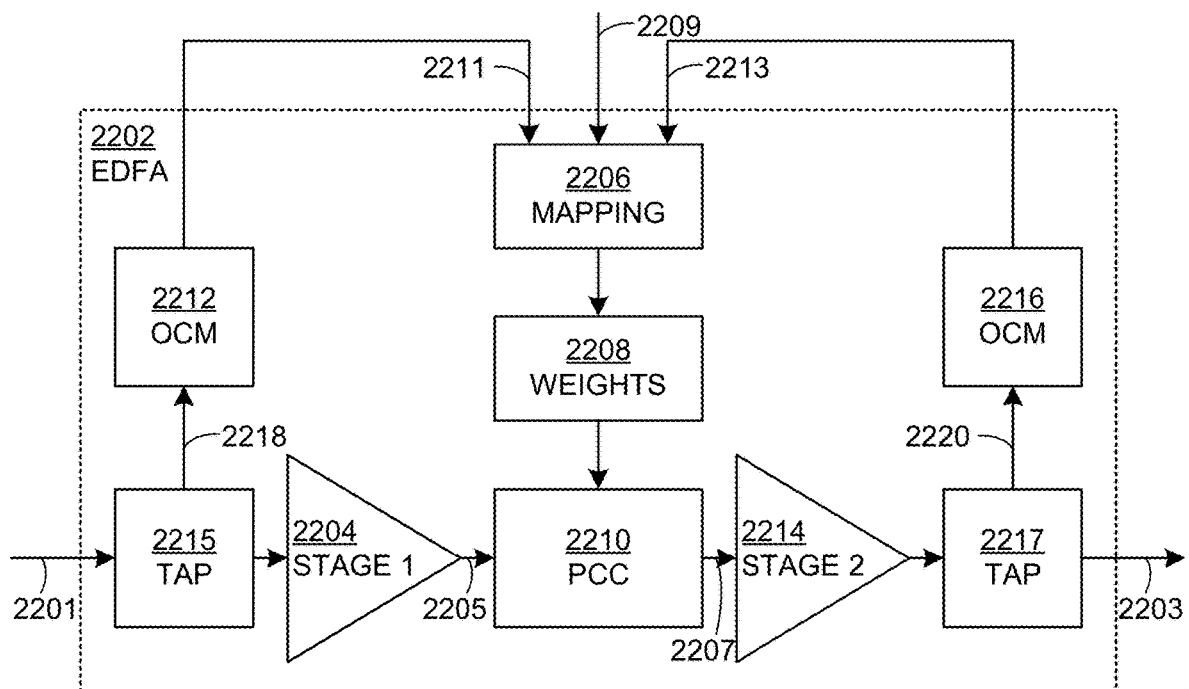
FIG. 22 illustrates a second example EDFA comprising an integrated PCC configured for nonlinearity compensation in a single span.

FIG. 22 illustrates a second example EDFA 2202 comprising an integrated PCC 2210 configured for nonlinearity compensation in a single span. Given an input optical signal 2201, the EDFA 2202 generates an output optical signal 2203. Where the EDFA 2202 is configured for nonlinearity pre-compensation of a target fiber, the output optical signal 2203 represents the signal provided to the target fiber. Where the EDFA 2202 is configured for nonlinearity post-compensation of a target fiber, the input optical signal 2201 represents the signal received from the target fiber.

The PCC 2210 is positioned between a first amplification stage 2204 and a second amplification stage 2214. Thus, the PCC 2210 receives an optical signal 2205 output by the first amplification stage 2204, and the PCC 2210 outputs an optical signal 2207 which is input to the second amplification stage 2214.

The PCC 2210 is associated with a mapping 2206 which is used to determine weights 2208 to be applied to the PCC 2210. Similarly to the PCC 2110, the PCC 2210 serves the functions of both nonlinearity compensation and spectrum ripple compensation. However, the architecture of the EDFA 2202 enables the PCC 2210 to dynamically equalize the signal spectrum while compensating for fiber nonlinearity.

A first optical splitter or tap 2215 may be applied to the optical signal 1301, thereby tapping off a small portion of the signal 2201 (for example, 2% to 5%), represented by signal 2218. A first optical channel monitor (OCM) 2212 may be applied to the signal 2218, thereby resulting in a signal 2211 representing the spectrum of the signal 2201 prior to amplification. Because only a small portion of the signal 2201 is diverted through the first OCM 2212, the majority of the signal 2201 enters the first amplification stage 2204. A second tap 2217 may be applied to the optical signal output by the second amplification stage 2214, thereby tapping off a small portion of that signal (for example, 2% to 5%), as represented by signal 2220. A second OCM 2216 may be applied to the signal 2220, thereby resulting in a signal 2213 representing the spectrum following amplification. Because only a small portion of the output of the second amplification stage 2214 is diverted through the second OCM 2216, the majority of the amplified output becomes the output signal 2203.

The simulation process 1800 and the calibration process 1900 may be modified to include different target ripples of the transfer function. The mapping 2206 generated by the modified processes 1800, 1900 may relate various fiber parameters, various input spectra, and various output spectra to their respective PCC weights. Thus, a given set of fiber parameters 2209, a target input spectrum 2211, and a target output spectrum 2213 may be used in conjunction with the mapping 2206 to select of the weights 2208 to be applied to the PCC 2210.

Figure 23:
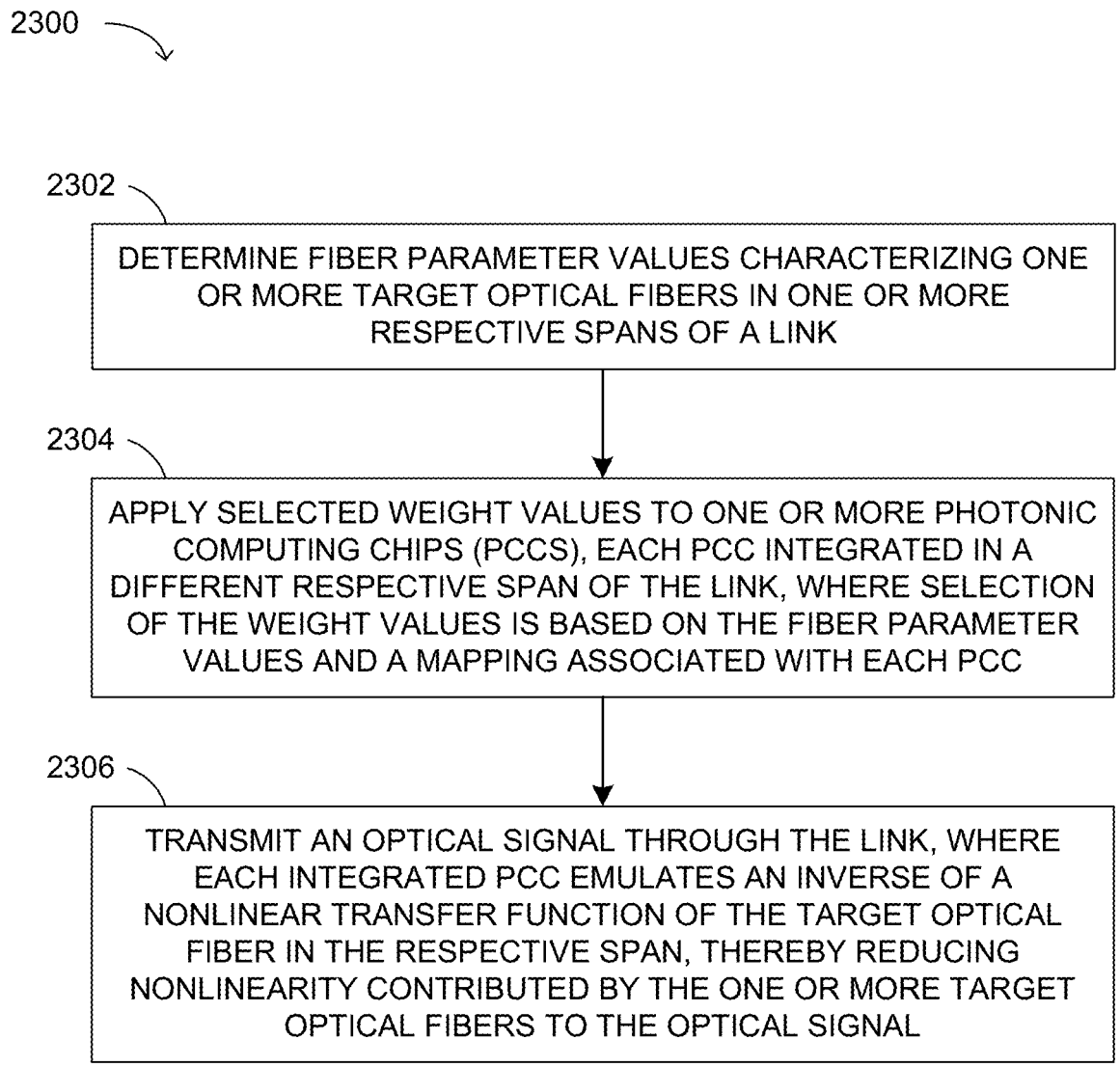
FIG. 23 illustrates an example method for per-span fiber nonlinearity compensation using integrated PCCs.

FIG. 23 illustrates an example method 2300 for per-span fiber nonlinearity compensation using integrated photonic computing. The method 2300 may be implemented in an optical link comprising a plurality of spans, where each span comprises a target optical fiber and a PCC configured to compensate for nonlinearity in the target optical fiber. The target optical fiber is characterized by a set of fiber parameters, such as the zero-dispersion wavelength $\lambda_0$, the dispersion slope S, the nonlinear coefficient $\gamma$, the fiber length L, and the fiber loss coefficient $\alpha$. The PCC is controlled by a set of weights. According to some examples, the architecture of the PCC is designed in accordance with a compensation model that is based on machine learning. For example, the PCC may have the architecture 500, and the set of weights may comprise the weights $wi_k$ for k=1 ... P and the weights $wo_k$, $wf_k$ for k=1 ... M. In another example, the PCC may have the architecture 600, and the set of weights may comprise the weights $wi_k$ and $wf_k$ for k=1 ... P and the weight matrix 616. According to some examples, the architecture of the PCC is designed in accordance with a compensation model based on analytical equations. For example, the PCC may have the architecture 1600 or 1700, and the set of weights may comprise the weights $w1_k$, $w2_k$, $d1_k$, and $d2_k$ for k=1 ... P. Together, the architecture of the PCC and the weights applied to the PCC may be configured to emulate the inverse of the transfer function of the target optical fiber to which the PCC is connected, including the nonlinear contribution to the transfer function. According to some examples, one or more of the PCCs in the optical link may be integrated into respective network elements, such as EDFAs, for example, as described with respect to FIGS. 21 and 22.

At 2302, fiber parameter values characterizing one or more target optical fibers in one or more respective spans of a link are determined. For example, the values of fiber parameters, such as the zero-dispersion wavelength $\lambda_0$ of each target optical fiber, the dispersion slope S of each target optical fiber, the nonlinear coefficient $\gamma$ of each target optical fiber, the fiber length L of each target optical fiber, and the fiber loss coefficient $\alpha$ of each target optical fiber, may be determined. According to some examples, the values may be determined by measurements or by obtaining data or information provisioned by the manufacturer or network operator. According to some examples, the values of the fiber parameters may be measured using built-in instrumentation in optical line systems, for example the RLS platform provided by Ciena Corporation.

At 2304, selected weight values are applied to one or more PCCs, each PCC being integrated in a different respective span of the link, where selection of the weight values is based on the fiber parameter values determined at 2302, and based on a mapping associated with each PCC, where the mapping relates various combinations of fiber parameter values to various weight values. For example, the mapping may comprise a LUT or an ANN. The mapping may be stored in the host of the PCC, for example, the EDFA 2102 or the EDFA 2202. Where the PCC is separate from other optical elements, there may be a module or card hosting and controlling the PCC. The mapping may be generated in advance using some combination of the simulation process 1800 and the calibration process 1900. For example, the mapping associated with each PCC may be generated using a simulated version of the respective PCC and a plurality of simulated optical fibers; and the mapping may then be fine tuned using the respective PCC and a plurality of manufactured optical fibers. Since each span comprises a different target fiber (possibly characterized by different fiber parameter values), different weight values may be selected for each different PCC in the link.

At 2306, an optical signal is transmitted through the link (i.e., including the one or more target optical fibers and the respective integrated PCCs), where each integrated PCC emulates an inverse of a nonlinear transfer function of the target optical fiber in the respective span, thereby reducing the nonlinearity contributed by the one or more target optical fibers. By reducing nonlinear noise from the one or more target fibers, the nonlinear noise dominant regime may be pushed to a higher per-span launch power. Thereby, the launch power per span may be further increased with additional gain of incremental SNR at the one or more target fibers. The compensation is achieved by appropriate selection of the weights applied to the one or more PCCs at 2304, which is made possible by accurate determination of the fiber parameter values at 2302 and also by the accuracy of the fiber-parameter-to-weights mappings that are associated with the PCCs.

In general, a PCC may comprise photonic circuit elements and at least one electronic circuit element, where the photonic circuit elements are configured to apply optical signal processing to an input optical signal to generate an output optical signal, and where they are configured to control the optical signal processing based on values of fiber parameters characterizing the target optical fiber and a mapping associated with the PCC, such that the optical signal processing comprises operations that emulate the inverse of the nonlinear transfer function of the target optical fiber. Thus, for an input optical signal that comprises nonlinearity contributed by a given optical fiber, the PCC may be configured to reduce this nonlinearity in the respective output optical signal.

As noted previously, various PCC architectures are contemplated. In some examples, the PCC comprises a first element (such as the optical splitter 502 or 602, or the linear unit 1304) configured to generate, from the input optical signal, P weighted input signals characterized by P respective first weights (such as the weights $wi_k$ for k=1 ... P), where P is a positive integer and P≥2; and a second element (such as the optical combiner 510, 606, or 1312) configured to generate the output optical signal of the PCC from a plurality of weighted output signals characterized by a respective plurality of second weights (such as the weights $wf_k$ for k=1 ... M as described with respect to FIG. 5, or the weights $wf_k$ for k=1 ... P as described with respect to FIG. 6). In these examples, the one or more electronic circuit elements are configured to control the optical signal processing by controlling respective values of the first and second weights.

In some examples, the PCC further comprises P third elements (such as AWG 612 or 1306, or the tunable demultiplexer 904), each configured to divide a respective one of the P weighted input signals into N channelized input signals corresponding to N respective channels of an optical spectrum of the respective weighted input signal, where N is a positive integer and N≥2. In these examples, the PCC further comprises, for each third element, N fourth elements (such as the nonlinear node 604 or the nonlinear unit 1308) configured to apply N respective nonlinear operations to the N channelized input signals, thereby generating N channelized compensated signals. The PCC further comprises P fifth elements (such as the AWG 620 or 1310, or the tunable multiplexer 912), each configured to combine the N channelized compensated signals generated for a respective one of the P third elements. Each fourth element may comprise, for example, an EO modulator (such as the EO modulator 618) and a PD (such as the PD 614) configured to tap the respective channelized input signal. In these examples, the one or more electronic circuit elements are configured to control the optical signal processing by controlling the EO modulator based on an output of the PD and a weight matrix (such as the weight matrix 616).

In some examples where the operations applied by the optical signal processing are based on the RPM, the PCC may comprise a broadband optical splitter (such as the splitter 1606) configured to generate, from the input optical signal, P+1 input signals, where P is a positive integer and P≥2; a delay element (such as the delay 1613) configured to apply a delay to one of the P+1 input signals, thereby generating a delayed input signal; for each of the remaining input signals, a set of RPM elements (such the tunable dispersion nodes 1608, 1612, and the nonlinear nodes 1610) characterized by RPM weights (such as the weights $d1_k$, $w1_k$, $d2_k$, $w2_k$, for k=1 ... P) and configured to optically process the respective input signal based on the RPM, thereby generating a respective compensated signal, for a total of P compensated signals; and a broadband optical combiner (such as the combiner 1614) configured to combine the delayed input signal and the P compensated signals. In these examples, the one or more electronic circuit elements are configured to control the optical signal processing by controlling respective values of the RPM weights.

In other examples where the operations applied by the optical signal processing are based on the RPM, the PCC may comprise a first element (such as the AWG 1702) configured to divide the input optical signal into N channelized input signals corresponding to N respective channels of an optical spectrum of the input optical signal, where N is a positive integer and N≥2; N second elements (such as the optical splitter 1704), each configured to generate, from a respective one of the N channelized input signals, P input signals, where P is a positive integer and P≥2; for each second element, a set of RPM elements (such as the cascaded all-pass ring resonators 1706 and 1710, and the Kerr section 1708) characterized by RPM weights (such as the weights $d1_k$, $w1_k$, $d2_k$, $w2_k$, for k=1 ... P) and configured to optically process the P input signals based on the RPM, thereby generating P compensated signals; N third elements (such as the optical combiner 1714), each configured to combine the P compensated signals generated for a respective one of the N second elements, thereby generating a respective channelized compensated signal; and a fourth element (such as the AWG 1716) configured to combine the N channelized compensated signals. In these examples, the one or more electronic circuit elements are configured to control the optical signal processing by controlling respective values of the RPM weights.

It will be appreciated that the electronic circuit elements described herein may comprise, for example, one or more generic or specialized processors such as microprocessors, Central Processing Units (CPUs), Digital Signal Processors (DSPs), customized processors such as Network Processors (NPs) or Network Processing Units (NPUs), Graphics Processing Units (GPUs), or the like, Field-Programmable Gate Arrays (FPGAs), and the like along with unique stored program instructions (including both software and firmware) for control thereof. Alternatively, the electronic circuit elements may be implemented by a state machine that has no stored program instructions, or in one or more Application-Specific Integrated Circuits (ASICs), in which each function or some combinations of certain of the functions are implemented as custom logic or circuitry. A combination of the aforementioned approaches may also be used.

The electronic circuit elements described herein may comprise, for example, a non-transitory computer-readable medium having computer-executable instructions stored thereon. Examples of such a non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various examples.

The scope of the claims should not be limited by the details set forth in the examples, but should be given the broadest interpretation consistent with the description as a whole.

What is claimed is:

1. A photonic computing chip (PCC) comprising:
   photonic circuit elements configured to apply optical signal processing to an input optical signal to generate an output optical signal, wherein the input optical signal comprises nonlinearity contributed by a target optical fiber; and
   at least one electronic circuit element configured to control the optical signal processing based on values of fiber parameters characterizing the target optical fiber and a mapping associated with the PCC,
   wherein the optical signal processing comprises operations emulating an inverse of a nonlinear transfer function of the target optical fiber, such that the PCC reduces the nonlinearity in the output optical signal relative to the nonlinearity in the input optical signal.

2. The PCC as claimed in claim 1, wherein the operations are based on machine learning.

3. The PCC as claimed in claim 1, wherein the PCC comprises
   a first element configured to generate, from the input optical signal, P weighted input signals characterized by P respective first weights, wherein P is a positive integer and P≥2; and
   a second element configured to generate the output optical signal of the PCC from a plurality of weighted output signals characterized by a respective plurality of second weights,
   wherein controlling the optical signal processing comprises controlling respective values of the first and second weights.

4. The PCC as claimed in claim 3, wherein the PCC comprises
   P third elements, each configured to divide a respective one of the P weighted input signals into N channelized input signals corresponding to N respective channels of an optical spectrum of the respective weighted input signal, wherein N is a positive integer and N≥2;
   for each third element, N fourth elements configured to apply N respective nonlinear operations to the N channelized input signals, thereby generating N channelized compensated signals;
   P fifth elements, each configured to combine the N channelized compensated signals generated for a respective one of the P third elements.

5. The PCC as claimed in claim 4, wherein each fourth element comprises an electro-optic (EO) modulator and a photodiode (PD) configured to tap the respective channelized input signal, and wherein controlling the optical signal processing comprises controlling the EO modulator based on an output of the PD and a weight matrix.

6. The PCC as claimed in claim 4, wherein the third element comprises an arrayed waveguide grating (AWG) serving as a demultiplexer, and wherein the fifth element comprises an AWG serving as a multiplexer.

7. The PCC as claimed in claim 4, wherein the third element comprises a tunable demultiplexer, and wherein the fifth element comprises a tunable multiplexer.

8. The PCC as claimed in claim 1, wherein the PCC comprises
   at least one splitting element configured to separate an optical signal into a plurality of orthogonal input signals;
   for each orthogonal input signal, a duplicate version of at least a portion of the photonic circuit elements and the at least one electronic circuit element, the duplicate version being configured to process the orthogonal input signal to generate an orthogonal output signal, thereby resulting in a plurality of orthogonal output signals corresponding to the plurality of orthogonal input signals; and
   at least one combining element configured to combine the plurality of orthogonal output signals.

9. The PCC as claimed in claim 1, wherein the fiber parameters comprise one or more of a zero-dispersion wavelength $\lambda_0$ of the target fiber, a dispersion slope S of the target fiber, a nonlinear coefficient $\gamma$ of the target fiber, a length L of the target fiber, and a loss coefficient $\alpha$ of the target fiber.

10. The PCC as claimed in claim 1, wherein the operations are based on the Regular Perturbation Method (RPM).

11. The PCC as claimed in claim 10, wherein the PCC comprises
    a broadband optical splitter configured to generate, from the input optical signal, P+1 input signals, wherein P is a positive integer and P≥2;
    a delay element configured to apply a delay to one of the P+1 input signals, thereby generating a delayed input signal;
    for each of the remaining input signals, a set of RPM elements characterized by RPM weights and configured to optically process the respective input signal based on the RPM, thereby generating a respective compensated signal, for a total of P compensated signals; and
    a broadband optical combiner configured to combine the delayed input signal and the P compensated signals,
    wherein controlling the optical signal processing comprises controlling respective values of the RPM weights.

12. The PCC as claimed in claim 10, wherein the PCC comprises
    a first element configured to divide the input optical signal into N channelized input signals corresponding to N respective channels of an optical spectrum of the input optical signal, wherein N is a positive integer and N≥2;
    N second elements, each configured to generate, from a respective one of the N channelized input signals, P input signals, wherein P is a positive integer and P≥2;
    for each second element, a set of RPM elements characterized by RPM weights and configured to optically process the P input signals based on the RPM, thereby generating P compensated signals;
    N third elements, each configured to combine the P compensated signals generated for a respective one of the N second elements, thereby generating a respective channelized compensated signal; and
    a fourth element configured to combine the N channelized compensated signals,
    wherein controlling the optical signal processing comprises controlling respective values of the RPM weights.

13. The PCC as claimed in claim 1, wherein the PCC is positioned between a first amplification stage and a second amplification stage within an erbium-doped fiber amplifier (EDFA).

14. A method comprising:
- determining values of fiber parameters characterizing one or more target optical fibers in one or more respective spans of a link;
- applying selected weight values to one or more photonic computing chips (PCCs), each PCC integrated in a different respective span of the link, wherein selection of the weight values is based on the values of the fiber parameters and a mapping associated with each PCC; and
- transmitting an optical signal through the link, wherein each integrated PCC emulates an inverse of a nonlinear transfer function of the target optical fiber in the respective span, thereby reducing nonlinearity contributed by the one or more target optical fibers to the optical signal.

15. The method as claimed in claim 14, wherein determining the values comprises measuring the values from the target optical fiber or obtaining the values from provisioning.

16. The method as claimed in claim 14, wherein the fiber parameters comprise one or more of a zero-dispersion wavelength $\lambda_0$ of each target optical fiber, a dispersion slope S of each target optical fiber, a nonlinear coefficient $\gamma$ of each target optical fiber, a length L of each target optical fiber, and a loss coefficient $\alpha$ of each target optical fiber.

17. The method as claimed in claim 14, wherein the PCC is designed in accordance with a nonlinear compensation model based on machine learning.

18. The method as claimed in claim 14, wherein the PCC is designed in accordance with a nonlinear compensation model based on analytical equations.

19. The method as claimed in claim 14, wherein the mapping associated with each PCC comprises a look-up table (LUT) or an artificial neural network (ANN).

20. The method as claimed in claim 14, further comprising
- generating the mapping associated with each PCC using a simulated version of the respective PCC and a plurality of simulated optical fibers; and
- fine tuning the mapping associated with each PCC using the respective PCC and a plurality of manufactured optical fibers.

* * * * *